(12) United States Patent
Lobanoff

(10) Patent No.: US 7,028,872 B2
(45) Date of Patent: Apr. 18, 2006

(54) STORAGE DEVICE FOR A CARGO SPACE FOR A MOTOR VEHICLE

(75) Inventor: Mark Lobanoff, Troy, MI (US)

(73) Assignee: BOS GmbH & Co. KG, Ostfildern (DE)

( * ) Notice: Subject to any disclaimer, the term of this patent is extended or adjusted under 35 U.S.C. 154(b) by 78 days.

(21) Appl. No.: 10/354,444

(22) Filed: Jan. 30, 2003

(65) Prior Publication Data

US 2004/0020956 A1 Feb. 5, 2004

Related U.S. Application Data

(60) Provisional application No. 60/353,704, filed on Jan. 31, 2002.

(51) Int. Cl.
B60R 11/00 (2006.01)
B60R 9/00 (2006.01)

(52) U.S. Cl. .................. 224/497; 224/496; 224/498; 211/85.15; 211/123; 296/37.1

(58) Field of Classification Search ............... 224/495, 224/496, 497, 498, 499, 42.34, 42.35, 42.36, 224/500; 211/85.15, 123, 124, 195; 296/37.1
See application file for complete search history.

(56) References Cited

U.S. PATENT DOCUMENTS

| | | | | |
|---|---|---|---|---|
| 526,249 A * | 9/1894 | Meeker | ...................... | 220/9.3 |
| 1,505,182 A * | 8/1924 | Wrixton | ...................... | 224/572 |
| 1,527,056 A * | 2/1925 | Martin | ...................... | 224/572 |
| 2,079,592 A * | 5/1937 | Battin | ...................... | 248/100 |
| 2,421,221 A * | 5/1947 | Rothe | ...................... | 232/30 |
| 2,778,553 A * | 1/1957 | Satrom et al. | ...................... | 224/483 |
| 2,925,172 A * | 2/1960 | Hopp | ...................... | 224/483 |
| RE26,299 E * | 11/1967 | Burns | ...................... | 224/275 |
| 3,986,656 A | 10/1976 | November | | |
| 4,979,705 A * | 12/1990 | Bovitz | ...................... | 248/97 |
| 5,234,116 A * | 8/1993 | Kristinsson et al. | ......... | 211/201 |
| 5,366,124 A * | 11/1994 | Dearborn, IV | ...................... | 224/542 |
| 5,368,210 A * | 11/1994 | Wotring | ...................... | 224/404 |
| 5,520,316 A | 5/1996 | Chen | | |
| 5,628,442 A * | 5/1997 | Wayne | ...................... | 224/543 |
| 5,713,502 A | 2/1998 | Dixon | | |
| D404,861 S * | 1/1999 | Balensiefer, II | ...................... | D32/37 |
| 6,183,177 B1 | 2/2001 | Dahlgren | | |
| 6,623,060 B1 * | 9/2003 | Gehring et al. | ............. | 296/37.5 |
| 2003/0057171 A1 * | 3/2003 | Wang | ...................... | 211/195 |

FOREIGN PATENT DOCUMENTS

| | | |
|---|---|---|
| DE | 73003614 | 5/1973 |
| EP | 0 459 202 | 12/1991 |
| GB | 2 303 618 | 2/1997 |

* cited by examiner

Primary Examiner—T. Mai
(74) Attorney, Agent, or Firm—Flynn, Thiel, Boutell & Tanis, P.C.

(57) ABSTRACT

A storage device for a motor vehicle, such as a station wagon, including at least one partially flexible storage bag, which can be firmly secured in the cargo space, wherein each of two opposing sides of the storage bag features a dimensionally stable supporting section extending along at least one entire horizontal length of the side to which it corresponds, wherein the opposing fronts of the supporting sections can be secured, in a detachable manner, in a mounting device in the cargo space, and the dimensionally stable supporting sections are connected to one another by a flexible folding structure that protrudes into at least one floor section of the storage bag.

26 Claims, 16 Drawing Sheets

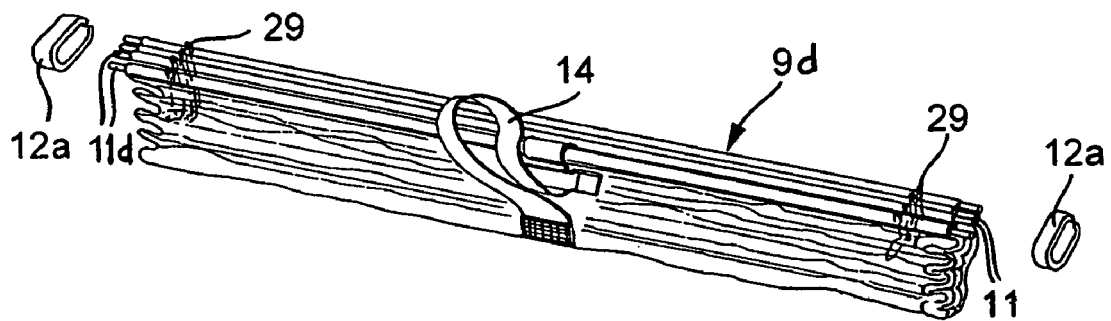
Fig. 15
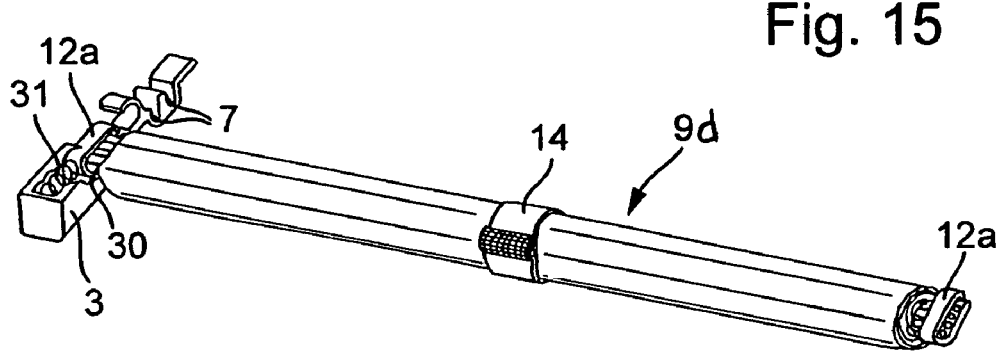
Fig. 16
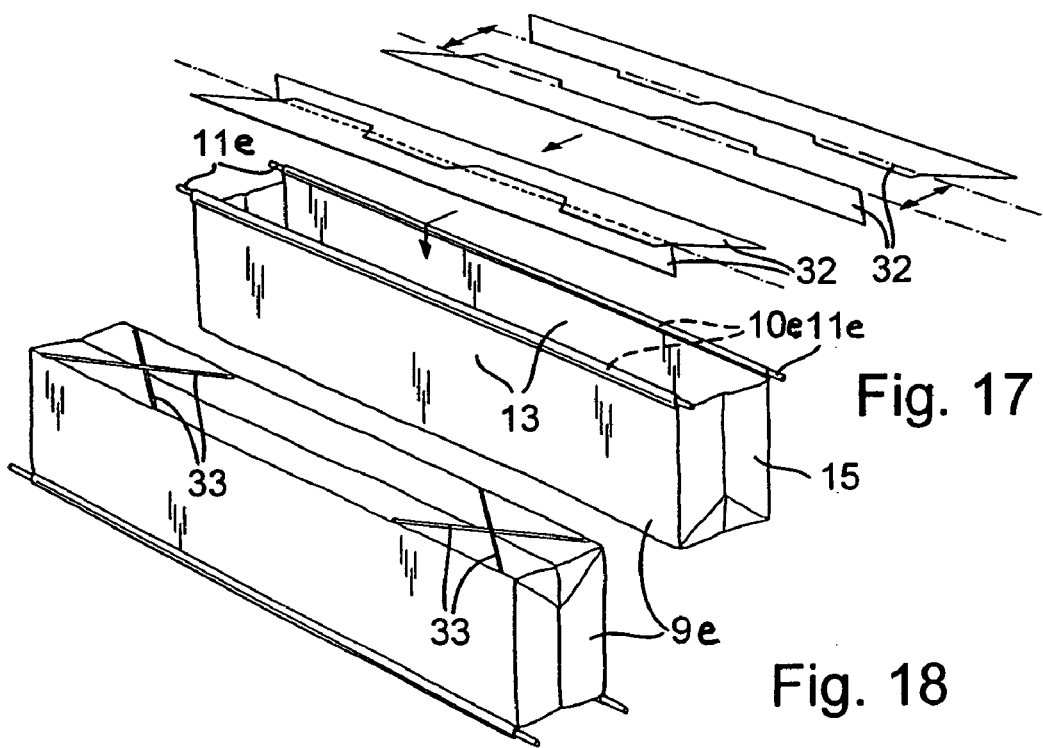
Fig. 17
Fig. 18

STORAGE DEVICE FOR A CARGO SPACE FOR A MOTOR VEHICLE

This application claims priority of the filing date of U.S. provisional application Ser. No. 60/353,704, filed Jan. 31, 2002, the complete text and drawings of which are incorporated herein by reference.

BACKGROUND OF THE INVENTION

1. The Technical Field

The invention relates to a storage device for a cargo space of a motor vehicle, comprising at least one partially flexible storage bag, which can be firmly secured in the cargo space.

2. The Prior Art

This type of storage device is known in the form of a storage net in the Mercedes-Benz S class. In a trunk of the automobile, several mountings for the storage net are provided in the proximity to a rear part, so that the storage net can be mounted to the rear part inside the trunk. The storage net features elastic loops with which it is secured to the mountings. The mountings are designed as fastening buttons permanently mounted inside the trunk in proximity to the rear part. The storage net can be removed when not in use.

The objective of the invention is to provide a storage device of the type mentioned initially, but which allows for variable use.

SUMMARY OF THE INVENTION

This objective is solved in that each of two opposing sides of the storage bag features a dimensionally stable supporting section at least as long as the side to which it corresponds, wherein the opposing fronts of the supporting sections can be detachably secured in a mounting device in the cargo space, and the dimensionally stable supporting sections are connected to one another by a flexible folding structure that protrudes into at least one floor section of the storage bag. The dimensionally stable supporting sections are, in particular, designed as longitudinal profile sections. However, it is also possible to design these supporting sections as two-dimensional side walls. It is advantageous when stable storage of the goods that are to be transported can be guaranteed. Because it is, secured to the mounting device in the trunk, the storage bag is held in a stable position, which stands in contrast to the state of the art, in which the elasticity of the retention straps and the net result in heavy items pulling the net down and the items resting on the floor of the trunk. The storage bag described by the invention features sufficient inherent rigidity to ensure a stable fit in the mounting device without the need for additional support in the area of the floor of the cargo space. As a result, the storage bag can also end at a distance above the trunk floor, thus allowing the trunk space below the storage bags to be loaded with additional items.

The dimensional stability permits simplified insertion or removal relative to the mounting device. Because it can be collapsed, the storage bag can be placed into a compact position when not in use. The mounting device is preferably designed so that at least two storage bags arranged in parallel can be secured. This makes it possible to place differently shaped items into different storage bags.

In an embodiment of the invention, the two storage bags are linked by means of a joint supporting section. This forms a pair of storage bags which, because of the use of a joint supporting section, reduces material requirements. When a joint supporting section is used, the pair of storage bags cannot be separated into two independent storage bags.

In a further embodiment of the invention, the supporting sections and the folding structure are arranged, in their operating positions, in such a way that the storage bag can be folded open or shut symmetrically to its central longitudinal axis. If, therefore, the supporting sections are aligned in parallel to one another and at the same level, resulting in a horizontal opening of the storage bag, the storage bag can be folded open or shut symmetrically to its vertical plane.

In a further embodiment of the invention, means are provided for automatic opening or closing of the storage bag. As a result, depending on requirements, the storage bag can be folded open and is therefore accessible in its unloaded position, or it can be folded shut and therefore compactly collapsed. It is advantageous for the storage bag to be folded open automatically, as the storage bag is then available for filling without the need for pulling its sides apart manually.

In a further embodiment of the invention, elastic tension or pressure elements engage in the area of the supporting sections as a means of automatic opening or closing. This is an especially simple and reliable embodiment.

In a further embodiment of the invention, the elastic tension or pressure elements are at least partially integrated into hollow profiles, especially in the area of the supporting sections. As a result, the elastic tension or pressure elements require less space and are protected against damage or wear and tear.

In a further embodiment of the invention, fasteners are provided to secure the storage bag in a compact state when it is not in use. In particular, the fasteners permit the storage bag to be tied together in its collapsed position or in another compact position. This allows for space-saving storage of the storage bag.

In a further embodiment of the invention, the folding structure progresses as a track-shaped fold between two supporting profiles serving as supporting sections. In this embodiment, the fold is suspended between the supporting profiles and forms a corresponding fold-shaped receptacle. The storage bag is open in the area of the opposing front edges of the fold. Additional separate means of closing the bag can be provided which fold together the opposing front edges of the fold.

In a further embodiment of the invention, the folding structure is provided with lateral folding segments in opposing front edge areas, with these folding segments acting as front side walls for the storage bag. This creates closed walls surrounding the storage bag, thus preventing objects from falling out of the bag from the side. The fact that the lateral folding segments can be folded together ensures that the storage bag can be folded together into a compact position, especially in symmetry to its central longitudinal plane.

In a further embodiment of the invention, at least one essentially dimensionally stable and, in particular, split insert floor is provided for a floor section of the folding structure. This insert floor, which can be inserted or removed as needed, adds rigidity to the floor section of the folding structure. The fact that the insert floor is split ensures that the storage bag can continue to be folded. It also ensures that the width of the insert floor can be varied, in that the sections of the insert floor can either overlap or abut one another.

In a further embodiment of the invention, the opposing fronts of each supporting section are designed as individual holding pins, each protruding laterally outward. In a further embodiment, the mounting device for securing the holding pins features corresponding receptacles. This makes it especially easy to attach or detach the storage bag, of which there is at least one, to or from the mounting device in the trunk. In a further embodiment of the invention, several holding pins on each side are combined, in a detachable manner, by means of a grouping unit, each of which can be attached to or detached from the mounting device. The mounting device is preferably divided into two opposing mounting areas arranged on either side of the storage bag, of which there is at least one. Advantageously, a group of at least two storage bags can be attached to the mounting device or removed from it in unison.

In a further embodiment of the invention, each mounting area is provided with a longitudinal guide in the cargo space which is at least partly arranged in parallel to a cargo space floor, thus allowing the holding pins or the respective grouping unit to be shifted. This allows for variable positioning of the storage bag, of which there is at least one, within the cargo space.

In a further embodiment of the invention, the two longitudinal guides feature corresponding open sections which are dimensioned in such a way that a corresponding holding pin or a grouping unit can be removed or inserted at the level of the respective section. Each open section is preferably lockable with a cover element, resulting in continuously aligned longitudinal guides.

In a further embodiment of the invention, each grouping unit is provided with a guide segment which is aligned with the corresponding longitudinal guide when the grouping unit is in its inserted condition. This makes it possible to move one or more holding pins within the grouping unit longitudinally along the guide segment and, furthermore, into the corresponding longitudinal guide without a transition.

In a further embodiment of the invention, a housing is provided for acceptance of at least one flexible two-dimensional structure which progresses at a diagonal to the longitudinal guides and is provided with holding pins in the area of opposing faces which are displaceably disposed in the longitudinal guides. As a housing, a cassette housing is preferably provided for the acceptance of a storage space cover which can be pulled out approximately horizontally and/or for the acceptance of a divider net which can be pulled out approximately vertically. The longitudinal guides thus serve, on the one hand, as a mounting for the storage bags and, on the other hand, to position or shift the housing. Additional mounting devices for the housing on the storage space side are therefore not necessary.

In a further embodiment of the invention, the housing features a blocking mechanism which detachably blocks the housing in the longitudinal guides. This makes it possible to anchor the housing in a crash-proof manner in the vehicle while nonetheless permitting removal or shifting of the housing as needed.

In a further embodiment of the invention, the longitudinal guide is designed to be pulled out in an extension of the mounting area. Preferably, the longitudinal guides of the opposing mounting areas can be pulled out toward the back through a rear opening of a motor vehicle, thus simplifying the loading or unloading of the storage bag, of which there is at least one.

In a further embodiment of the invention, blocking mechanisms are provided to lock the longitudinal guide and/or the grouping unit. This ensures that the storage bag, of which there is at least one, remains in its position in the cargo space in the event of a vehicle collision.

In a further embodiment of the invention, driving mechanisms are provided for shifting the holding pins or the grouping units within the longitudinal guide. This enables the storage bag to be automatically shifted into suitable positions, thereby increasing ease of operation, especially during loading and unloading.

In a further embodiment of the invention, front and/or rear terminal sections of the longitudinal guides are oriented downward toward the floor of the cargo space. This allows for compact storage of the supporting sections and, consequently, the storage bags on the floor of the cargo space when they are not in use. This also prevents removal of the storage bag when they are not in use. This embodiment is especially advantageous in a cargo space for an automobile with a rigid rear part. In this case, it is possible to deposit the storage bag onto the floor of the cargo space by means of the longitudinal guides, which progress in a downward direction in the area of the rear part, without impairing loading or unloading of the cargo space when the trunk lid is open.

In a further embodiment of the invention, adapters are provided so that the holding pins can be connected, in a detachable manner, to the mounting areas, the longitudinal guides, or the grouping units. In particular, the adapters can be designed as fastening elements which permit improved attachment to the mounting areas. The adapters can be removable from the holding pins of the supporting sections or they can be fixed.

In a further embodiment of the invention, adjacent adapters can be joined together, in a detachable manner, by means of snap-in locking mechanisms. As a result, several storage bags can be linked together to form one unit. In addition, opposing supporting sections for a single storage bag can be joined together, thus closing the corresponding opening of the storage bag.

In a further embodiment of the invention, the snap-in locking mechanisms are molded to the adapters in one piece. In this embodiment, the adapters are preferably manufactured in a plastic injection molding process. This permits cost-efficient, high unit volume production.

In a further embodiment of the invention, the mounting device inside the cargo space runs on movable bearings between a recessed inactive position, especially in the floor of the cargo space or in a divider, and an operating position. In this embodiment, the entire mounting device, when not in use, can be recessed into the floor of the cargo space, a side wall, soft trim covering a movable rear section, a seat back rest, or a similar wall divider component. Preferably, guiding mechanisms are provided that automatically guide the mounting device from this inactive position to its operating position. Suitable guiding mechanisms can be guide rails in opposing lateral walls of the cargo space. Suitable guiding mechanisms can also be telescoping rods or similarly shaped linear guiding mechanisms, which move the mounting device from a recessed position in the floor of the cargo space to an operating position. Instead of recessing the mounting device into the floor of the cargo space or a wall divider, it is also possible to place the mounting device in its inactive position onto the floor of the cargo space or onto the wall divider. The advantageous of this arrangement is that it eliminates the need to provide an additional recess in the floor of the cargo space or in the wall divider.

In a further embodiment of the invention, the mounting device features at least two movable mounting areas, which can be moved from an inactive position collapsed in the mounting device to an operating position spaced at a distance from one another and accepting at least one storage bag between the mounting areas. In this embodiment, the mounting areas can especially be compactly collapsed in the inactive position. To achieve the operating position, these sections are tilted outward and to the side, so that they are aligned in parallel to one another. In an especially advantageous embodiment, the mounting areas are arranged to pivot horizontally on the mounting device. When each section is opened to an angle of preferably 90.degree., the parallel and spaced orientation of the opposing mounting areas is in place.

In a further embodiment of the invention, a covering structure that can be pulled out horizontally and that covers at least one storage bag in a pulled-out position is assigned to the storage device. Preferably, the mounting device, preferably with both mounting areas, is arranged underneath an edge of the vehicle in such a way that an existing tarpaulin, which can be pulled out horizontally, can assume the function of covering the storage bag, of which there is at least one. Corresponding mounting grooves for securing the covering component in various pullout positions are preferably provided in the area of the mounting areas.

BRIEF DESCRIPTION OF THE DRAWINGS

Additional advantages and features are described in the claims, as well as in the following description of preferred executions of the invention, which are depicted in the figures.

FIG. 15 depicts the pair of storage bags depicted in FIG. 12, whose supporting profiles can be surrounded in the area of their holding pins by clamps serving as grouping units.

FIG. 16 depicts the pair of storage bags depicted in FIG. 15 in the tied-up inactive position, wherein the clamp-shaped grouping unit can be detachably secured in a corresponding receptacle area of the lateral mounting area.

FIG. 17 depicts an exploded view of an embodiment of a storage bag with front lateral folding sections, as well as with a two-part insert floor.

FIG. 18 depicts the storage bag depicted in FIG. 17 in its rotated position, with its base facing upward.

DETAILED DESCRIPTION OF THE DRAWINGS

Figure 1:
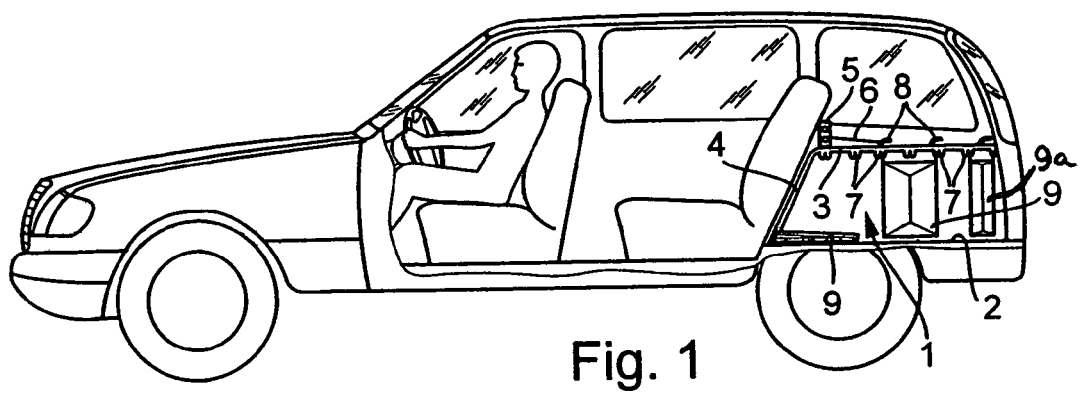
FIG. 1 schematically depicts, in a partial section of a lateral view, an execution of a storage device, as described by the invention, arranged in a rear cargo space of a station wagon.
Figure 2:
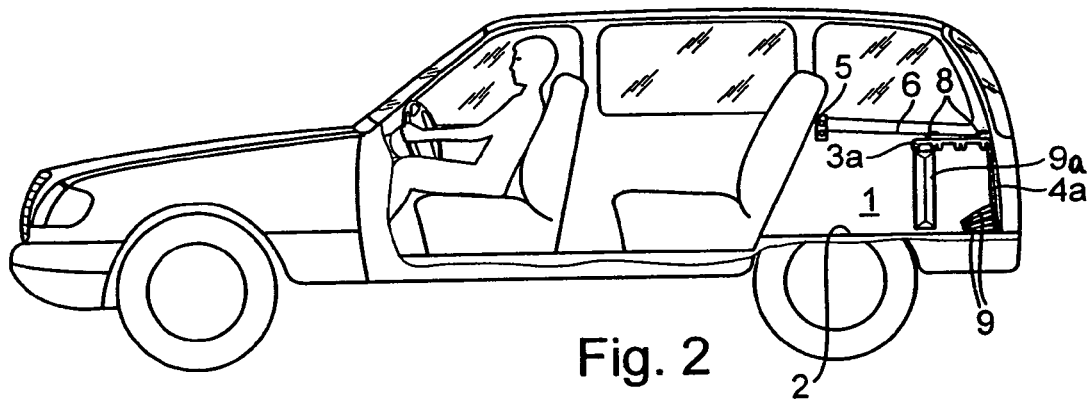
FIG. 2 shows a depiction similar to FIG. 1, but with a modified storage device.
Figure 3:
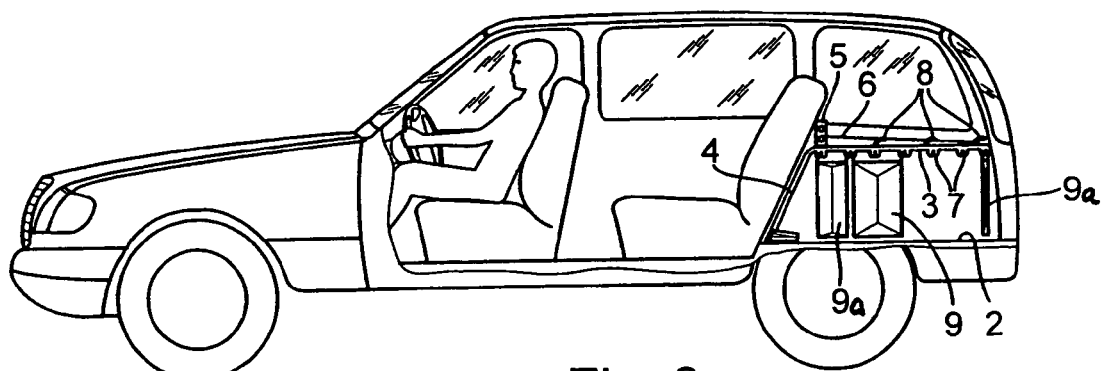
FIG. 3 shows a depiction similar to FIG. 1 or 2, but with a modified storage device.

According to FIG. 1, a station wagon such as that depicted in FIGS. 1 to 3 is provided, in its rear cargo space 1, with a storage device which, in the example depicted in the figure, features two storage bags 9, 9a. Each of the two storage bags 9, 9a consists in a folding structure which is box-shaped in its unfolded position and is open at the top. Each of the opposing longitudinal sides of each storage bag 9a is provided with a dimensionally stable supporting profile (FIG. 4) 10 in its upper edge area. Each supporting profile 10 is locked into a groove of the folding structure 13, which is preferably made of a flexible material, and is thus firmly anchored in the groove. Each supporting profile 10 extends along the entire length of the longitudinal side of the storage bag 9, 9a, with its front holding pins 11 on opposing front sides extending beyond the storage bags 9, 9a. In the example depicted in the figure, the holding pins are one-piece extensions or prolongations of the supporting profile, so that the holding pins 11 feature the same cross section as the supporting profiles 10. The folding structure 13 is therefore suspended on two supporting profiles 10 on each side. The longitudinal sides of the storage bags 9, 9a are oriented in a transverse direction relative to the vehicle, and are secured in a mounting device 3, 7 located in the cargo space in such a way that the supporting profiles extend horizontally and in a transverse direction relative to the vehicle. To secure the holding pins 11 of the supporting profiles 10, the mounting device features a mounting area on each of the opposing sides of the cargo space which, in the example depicted in the figure, comprises a receptacle and guide rail 3 which extends horizontally along at least a portion of the length of the cargo space. The receptacle and guide rail 3 features several receptacles 7 which, in the example depicted in the figure, are formed as trough-shaped and, in some cases, paired recesses. The recesses are designed to match the profile of the holding pins 7 so that the pins and the recesses can interlock.

Figure 4:
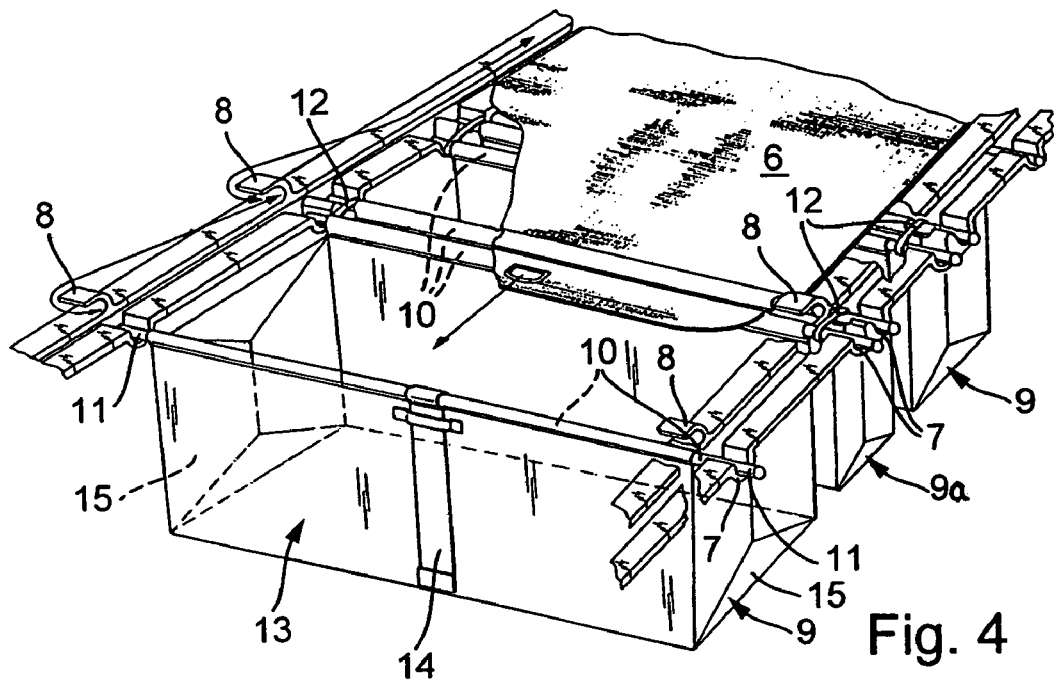
FIG. 4 depicts an enlarged, exploded view of a storage device as shown in FIG. 1 or 3.

As is evident in FIG. 4, two adjacent supporting profiles 10 of two storage bags are connected by a clamp 12 suitable for use as a grouping unit, wherein the clamp can be designed to elastic or inelastic. The clamp 12 is bow-shaped, as is evident in FIG. 4, so that it can surround the two supporting profiles in the area of the mounting grips 11.

In addition, the storage device is provided with a cargo space lock 5 which features a horizontally extractable tarpaulin 6. The horizontal tarpaulin 6 runs just above the mounting areas 3 and below an edge of the vehicle. For purposes of locking the tarpaulin 6, the mounting areas, which are anchored to the outside of the vehicle on opposite sides of the cargo space 1, feature on their upper side holding points in at least one defined pullout position, in this case in the form of clevis type hooks 8, which are arranged in pairs on the opposing mounting areas. Several pairs of clevis type hooks 8 are distributed along the length of the mounting areas, so that the tarpaulin 6 can be locked into several extractable positions. The purpose of the tarpaulin 6 is to cover the storage bags 9, which are open at the top, thereby preventing objects stored in the storage bags from falling out, as well as concealing the contents of the storage bags 9, 9a.

As is evident in FIGS. 1 to 3 or FIGS. 5 to 7, the mounting areas progress along opposing guide rails 4, 4a, 4b on the front or rear side of the cargo space 1 down to the floor of the cargo space 2. The guide rails 4, 4a, 4b and the guide rails 3 are designed in such a way that the holding pins 11 of the receptacle rails can be inserted into and moved along these guide rails. As the storage bags 9, 9a, 9b can be folded together, rolled up, or otherwise collapsed into a compact inactive position, as will be described in greater detail below, it is possible to store the storage bags 9, 9a, 9b in the front or rear portion of the floor of the cargo space 2 when they are not in use (FIGS. 1 to 3). As a result, they can stored in a space-saving manner and can be easily pushed into their operating position as needed. As they also remain anchored in the lateral guide rails 4, 4a, 4b in their inactive position, they are secured in their inactive position, which prevents them from sliding around in the cargo space.

The structure of the storage bags 9d, 9e is clearly recognizable in FIGS. 12 to 18. The examples depicted in the figures are based on two different variants. In both variants, a folding structure of a storage bag 9d, 9e is suspended on two longitudinal supporting profiles 10d, 10e. In the one variant depicted in FIG. 12, the folding structure is simply designed to be track-shaped, resulting in a fold that hangs down but is open to the opposing front sides. The other variant (FIG. 18) features a cuboid shape in its unfolded state. In this case, the folding structure is also provided with a star-shaped folding section 15 on its opposing front sides, which produces the star-shaped side walls for the folding structure and the storage bag. In this variant, the storage bag is therefore closed on all sides except at the top, where it is open.

Both variants can be folded together symmetrically along their central longitudinal plane, which is a vertical plane in the operating position, thereby forming a thin structure. At least the variant depicted in FIG. 12 can also be rolled up, as the flexible two-dimensional structure is simply designed in the form a track. In the variant depicted in FIG. 18, it is possible to embed think, plate-shaped rigid elements into the wall sections of the folding section, thereby increasing the stability of the folding structure and the storage bag.

To support the folding together motion of the storage bag depicted in FIGS. 17 and 18, elastic tension elements 33 are provided in the floor which apply tension to the floor when the two-dimensional structure is open, as shown in FIGS. 17 and 18, so that when a brief tap is applied in the folding direction the folding together motion is supported by the tensile forces of the tension elements 33.

Figure 12:
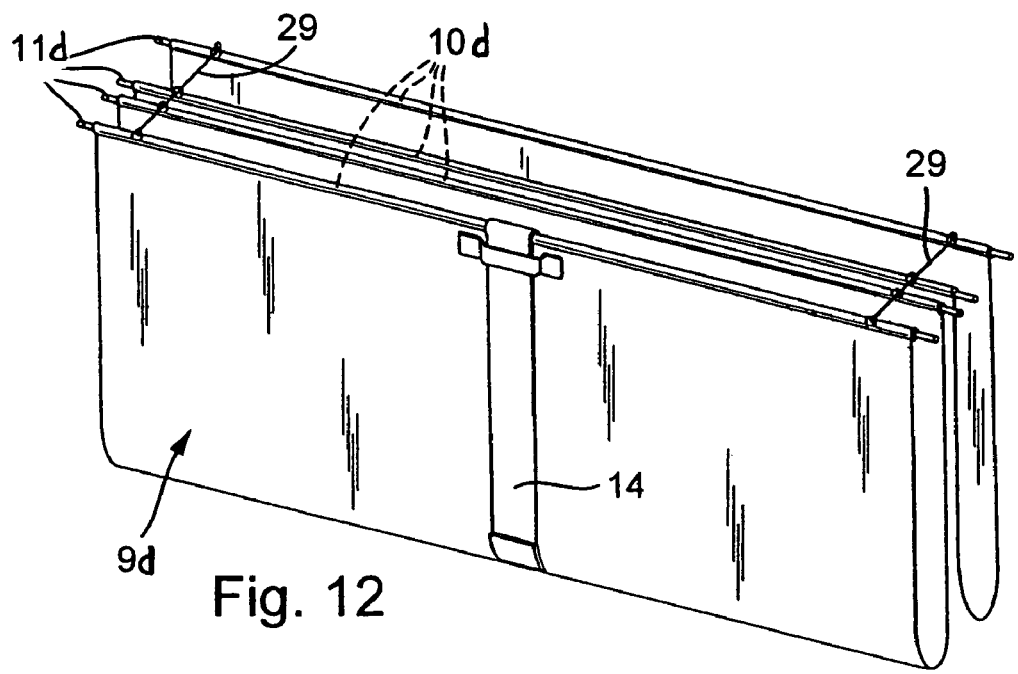
FIG. 12 depicts two storage bags whose supporting profiles are connected by elastic fasteners in such a way as to result in a pair of storage bags.

In the storage bags depicted in FIG. 12, two storage bags are connected to one another in pairs in proximity to their upper ends, i.e., in proximity to the supporting profiles 10d, by elastic tension elements 29. These tension elements 29 prevent the storage bags from being pulled open too far.

Contrary to the variant depicted in FIGS. 17 and 18, it is possible, in an embodiment of the invention not depicted here, to use elastic tension elements to move the storage bag from its collapsed position to its open storage position or to at least support this unfolding movement. Such tension elements can also be designed as pressure elements. Tension elements can also be used to apply tensile forces to open the storage bag.

As is evident in FIG. 17, it is also possible to make a floor of the folding structure 13 rigid through the use of an insert floor 32. In the example depicted in the figure, the insert floor 32 consists of two parts, which can either abut one another or can be joined together in overlapping fashion, as is shown in the exploded views. The exteriors of the two insert floors 32 are beveled in trapezoid fashion so as to prevent the lateral folding sections 15 from folding inward.

Figure 13:
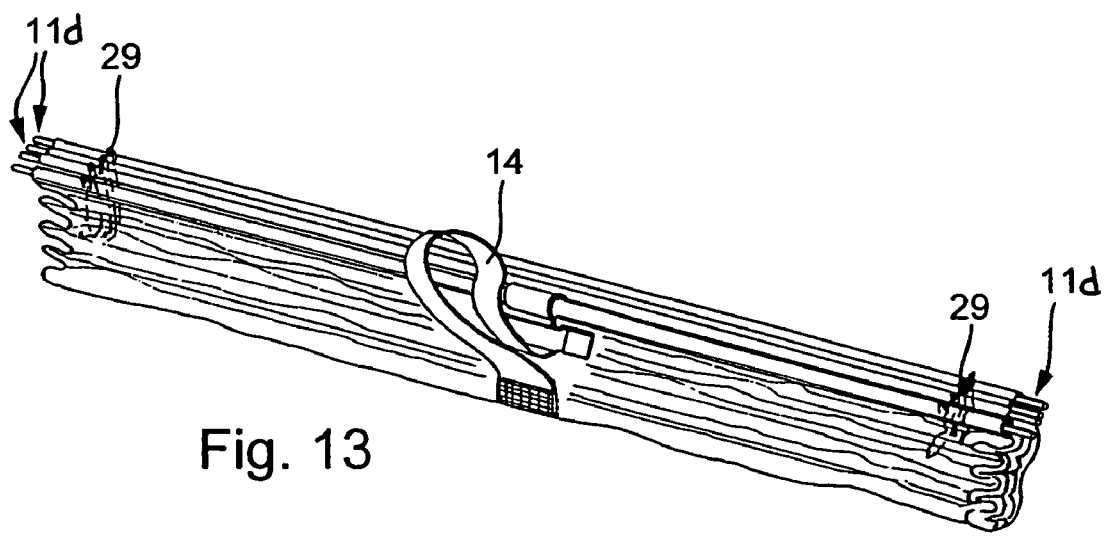
FIG. 13 depicts the pair of storage bags depicted in FIG. 12 in a collapsed intermediate position.
Figure 14:
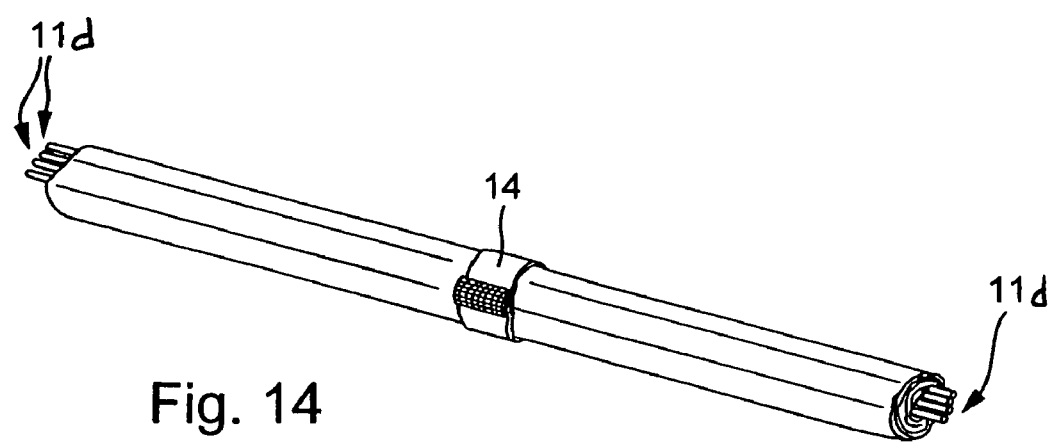
FIG. 14 depicts the pair of storage bags depicted in FIGS. 12 and 13 in the firmly tied-up and rolled-together inactive position.

A tightening belt 14 is assigned to the pair of storage bags depicted in FIG. 12 which can tie together the pair of storage bags into a compact, collapsed and/or rolled-up inactive position, as depicted in FIGS. 13 and 14. As is evident in FIGS. 15 and 16, it is also possible to fold together the holding pins 11d of the supporting profiles 10d of both storage bags 9d, which protrude from the sides of the opposing fronts, using a clamp 12a that acts as a grouping unit. For each clamp 12a, a receptacle 30 in which the clamp 12a can be detachably retained is provided in the opposing mounting areas of the mounting device inside the cargo space. In the embodiment depicted in FIG. 16, a schematically depicted retention spring 31 supports the attachment of the clamp 12a in the receptacle 30.

As is evident in FIGS. 5 to 8, adapters 20 in the form of gliding or rolling elements are assigned to the holding pins of the supporting profiles 10b of the storage bags 9b, with each of these adapters being longitudinally displaceable along a guide rail in the mounting area 3b. The transition from the horizontal guide rails to the guide rails that progress vertically downward 4b (FIG. 5) is achieved with a baffle plate 19, which is depicted in detail in FIGS. 5 to 7. As is particularly evident in FIG. 7, a guide groove, which the guide rails 3b, 4b also feature, continues in this baffle plate 19, wherein the guide groove, upon exiting the guide rail 3b, initially curves upward and is then curved downward in a vertical direction. This prevents the storage bags 9 from continuing into the vertical guide rails 4b without resistance and, consequently, falling downward when they slide toward the back. Upon gliding or rolling toward the back, the gliding or rolling elements of the adapters 20 come into contact with the upwardly curved baffle plate, so that it acts as a limit stop. Without manual and therefore intentional upward movement of the supporting profiles, the rolling or gliding elements cannot move into the vertical, downward-progressing guide rail 4b.

Figure 5:
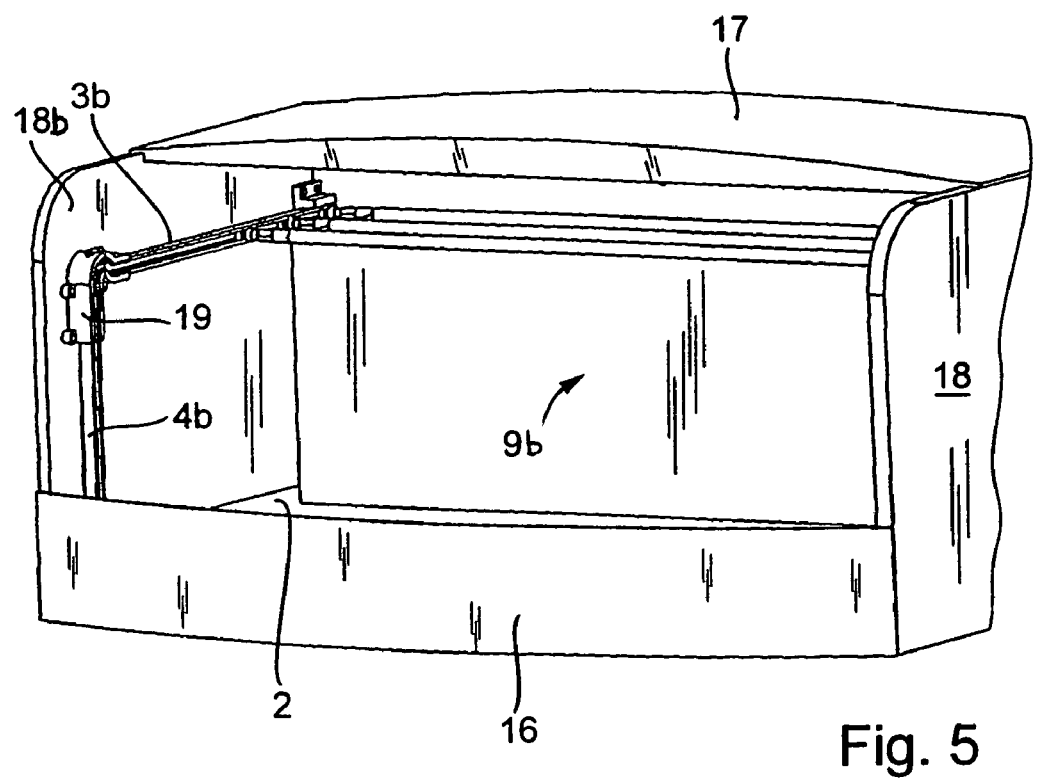
FIG. 5 schematically depicts a cargo space or a motor vehicle with an additional embodiment of a storage device as described by the invention.
Figure 6:
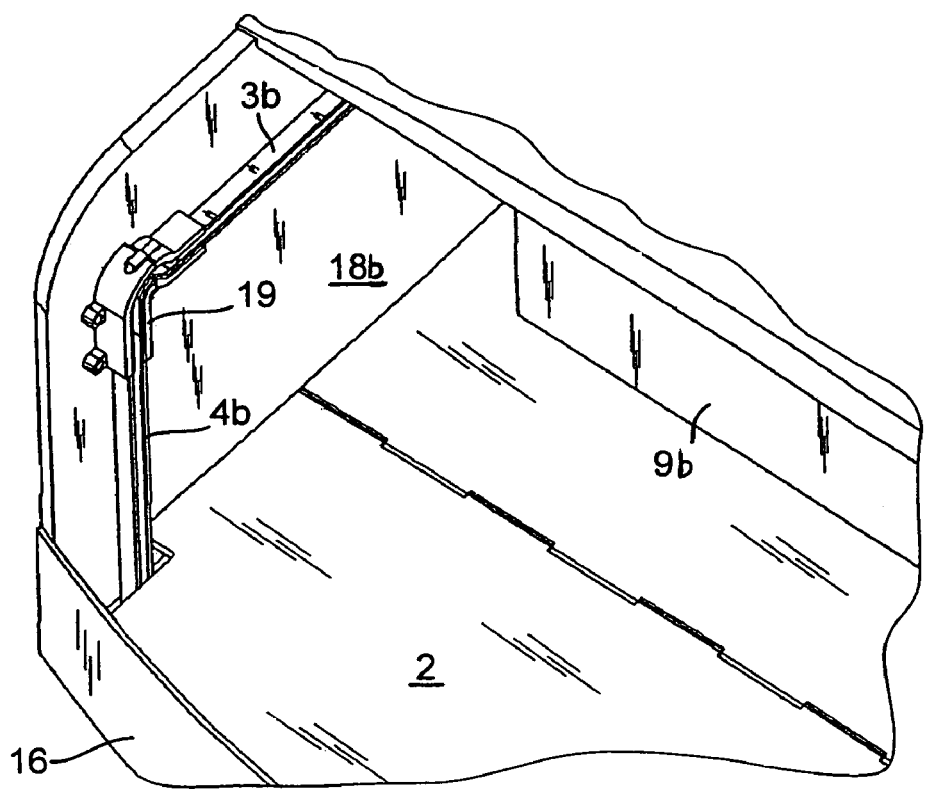
FIG. 6 depicts the cargo space shown in FIG. 5, but from a different perspective.
Figure 7:
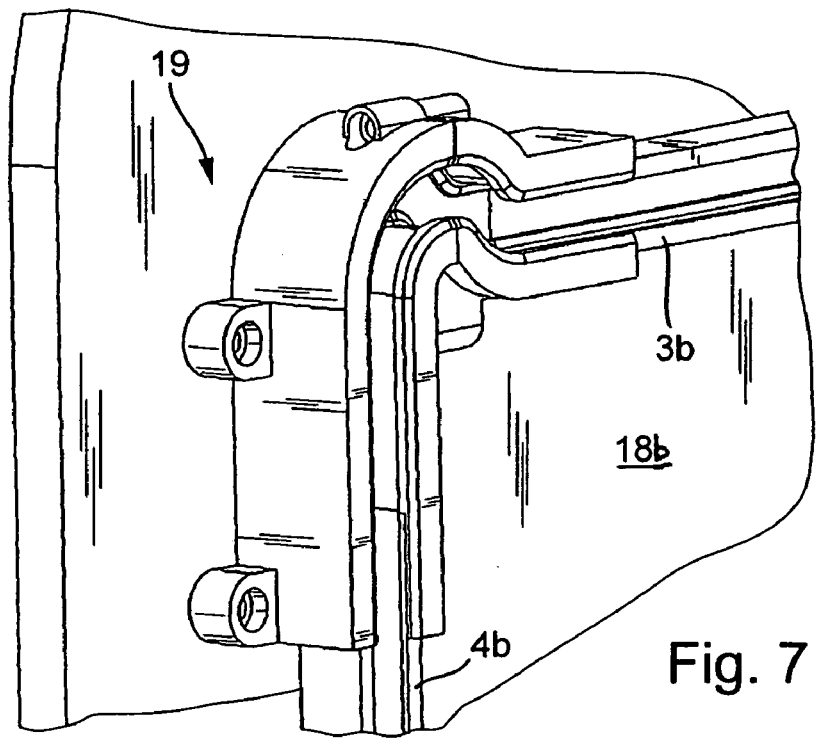
FIG. 7 depicts an enlarged, exploded view of a section of the storage device depicted in FIG. 6.
Figure 8:
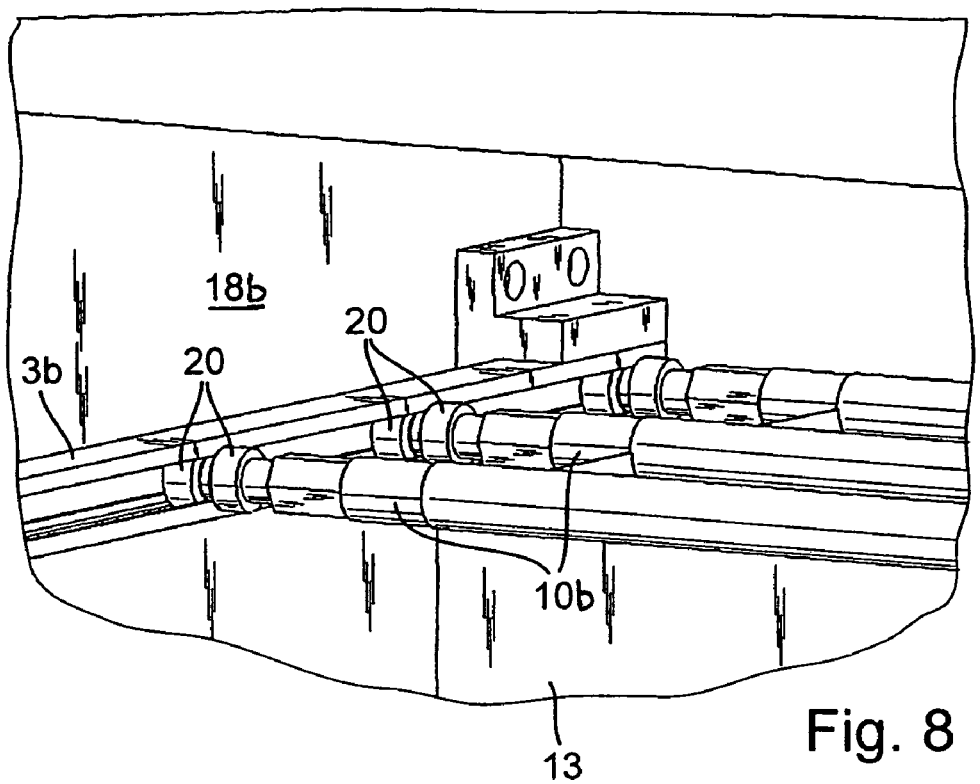
FIG. 8 depicts an enlarged, exploded view of another section of the storage device depicted in FIG. 5.

As is evident in FIGS. 5 and 6, the back of the cargo space is delimited by a rear part 16 in the area of the cargo space floor 2. This part protrudes upward over the cargo space floor 2 to a certain extent. The storage bags can be placed into this area without their obstructing the size of the cargo space opening for loading and unloading material. The cargo space depicted in FIGS. 5 to 8 represents, in particular, a cargo space for a notchback sedan in the rear portion of this type of vehicle. Reference number 17 indicates a schematically depicted, upper delineation of the cargo space, which connects to a trunk lid in the front relative to the longitudinal direction of the vehicle. The cargo space is laterally delimited by side walls 18b. The guide rails 3b, 4b and the baffle plate 19 for each mounting area are secured to these side walls 18b.

Figure 9:
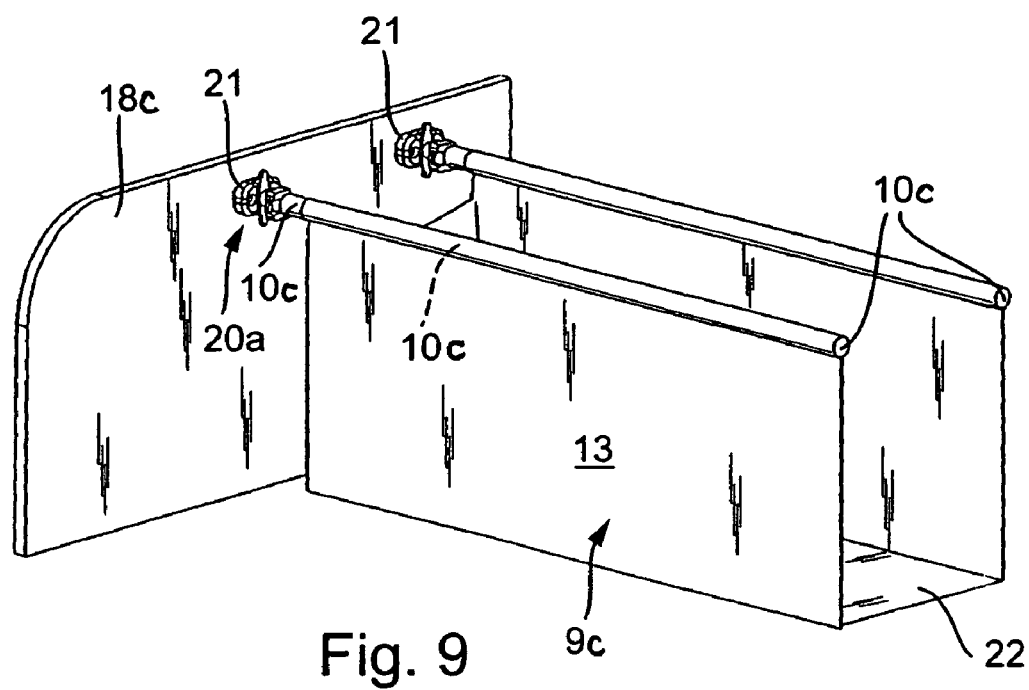
FIG. 9 depicts an exploded view of a cargo space with an additional embodiment of a storage device as described by the invention, wherein the left half of the storage device is shown for reasons of clarity.
Figure 10:
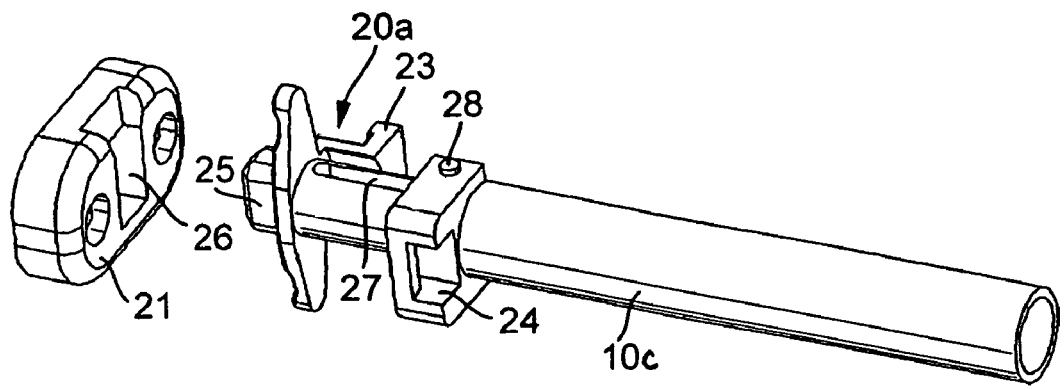
FIG. 10 depicts an enlarged, exploded view of a supporting section provided with an adapter for a holding pin, which can be secured in a receptacle permanently mounted in the vehicle.
Figure 11:
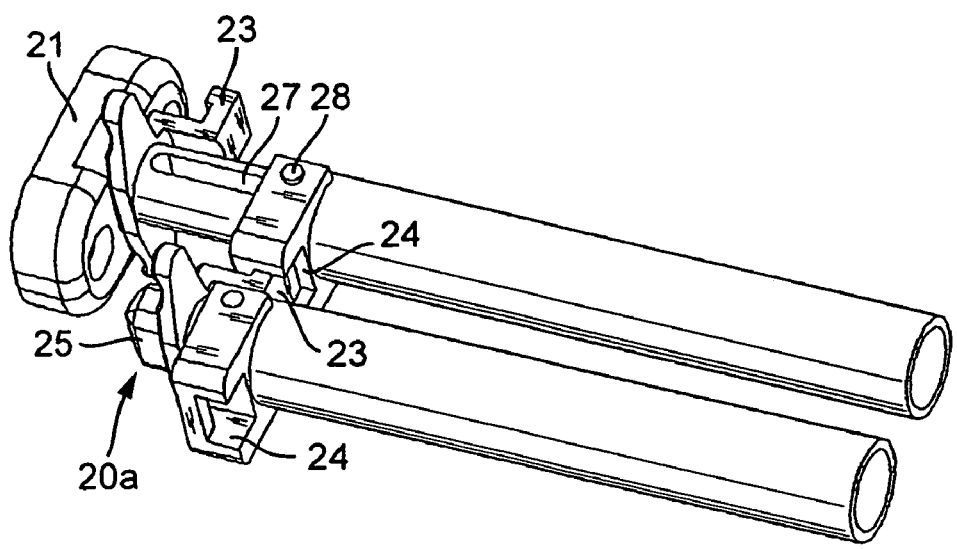
FIG. 11 depicts two adjacent supporting sections, as depicted in FIG. 10, in a holding position in which they are joined together.

In the embodiment depicted in FIGS. 9 to 11, the supporting profiles 10c are provided with adapters 20a in the area of the laterally outward protruding holding pins for the storage bag 9c. These adapters are provided with plug-in pins 25 for insertion into mounting areas 21 on the side of the vehicle.

In contrast to the embodiment of a mounting device as shown in the figures described above, which is provided with guide rails, the mounting areas on the opposing side walls 18c are simply consist of plug-in receptacles, each of which features a plug-in groove 26 which is open at the top. This plug-in groove 26 is designed to match the plug-in pins on each supporting profile 10c, which are recognizable in FIGS. 10 and 11, so that the plug-in pins 25 can be inserted into the plug-in groove 26 from above and can then lock into it. In the embodiment depicted in the figure, the plug-in pin 25 features a cube-shaped profile, which prevents the adapter 20a and, consequently, the supporting profile from twisting in the plug-in groove 26 in its inserted position. The adapter 20a for each supporting profile is arranged so that it can be shifted longitudinally relative to the supporting profile 10c. To this end, a guide slit 27 is assigned to a cylindrical extension of the adapter 20a. A rocker pin 28 which is firmly attached to the supporting profile 10c engages this guide slit. In a manner not depicted in the figure, a fastener is provided that locks the adapter 20 into a desired pull-out position, which prevents the cylindrical extension of the adapter 20a from pushing itself back into the supporting profile 10c in response to relative motion occurring during vehicle operation, which, under certain circumstances, could result in the plug-in pin 25 sliding out of the plug-in groove 26. The receptacle unit in which the rocker pin 28 is arranged, and which is firmly connected to the supporting profile 10c, is also provided with a catch groove 24 that projects laterally outward. A corresponding catch hook 23 of an adjacent adapter 20a can be hooked into this catch groove to secure an adjacent supporting profile in a parallel abutting position, as shown in FIG. 11. This makes it possible to connect several supporting profiles 10c of adjacent storage bags with one another. If two supporting profiles for a single storage bag are connected to one another, this connection automatically closes the opening for loading and unloading the storage bag.

Figure 19:
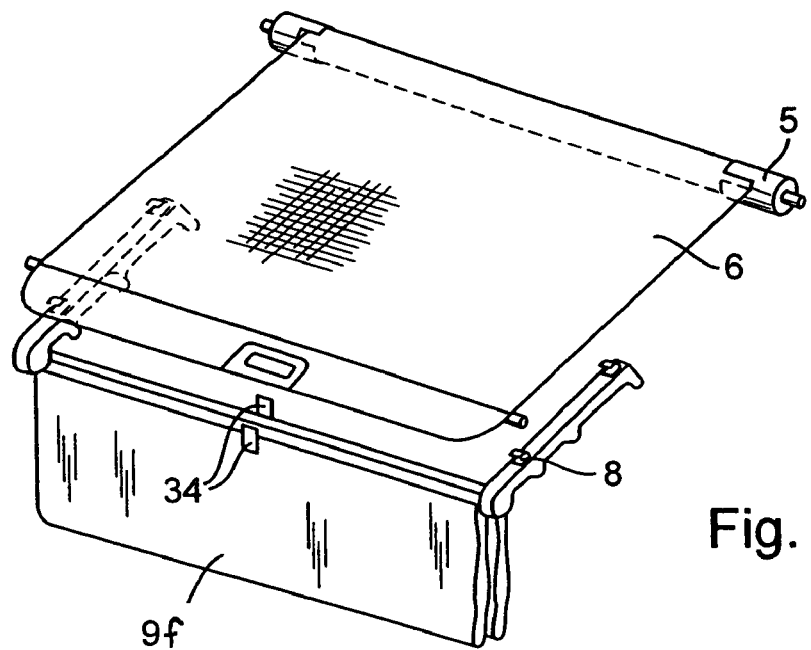
FIG. 19 depicts an exploded view of an embodiment of a storage bag as described by the invention, which can be covered with a horizontal tarpaulin from a covering blind.

The embodiment depicted in FIG. 19 corresponds essentially to the embodiments described on the basis of FIGS. 1 to 4, so that reference is made to that disclosure. The only difference is that in this case the storage bag 9f features opening aids in the form of handle straps 34 in the area of the supporting profiles. This facilitates opening of the storage opening of the storage bag.

Figure 20:
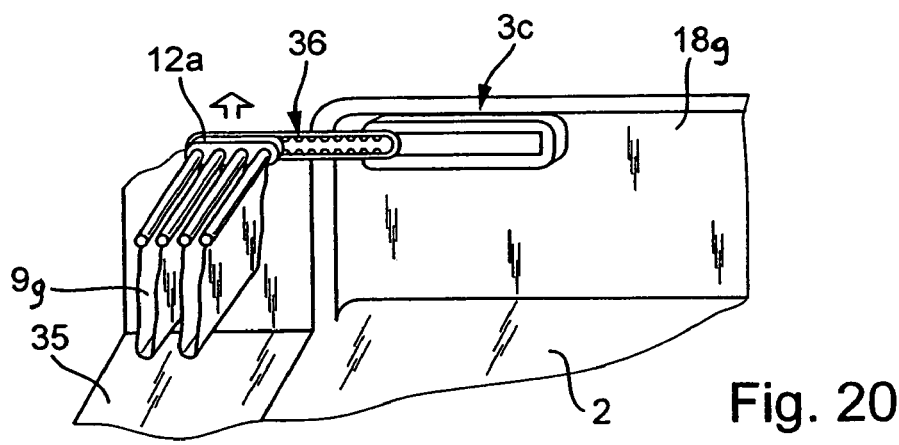
FIG. 20 depicts an additional embodiment of a storage bag in which the lateral mounting areas are provided with extractable longitudinal guides into which several storage bags with front holding pins or with corresponding adapters can be secured.
Figure 21:
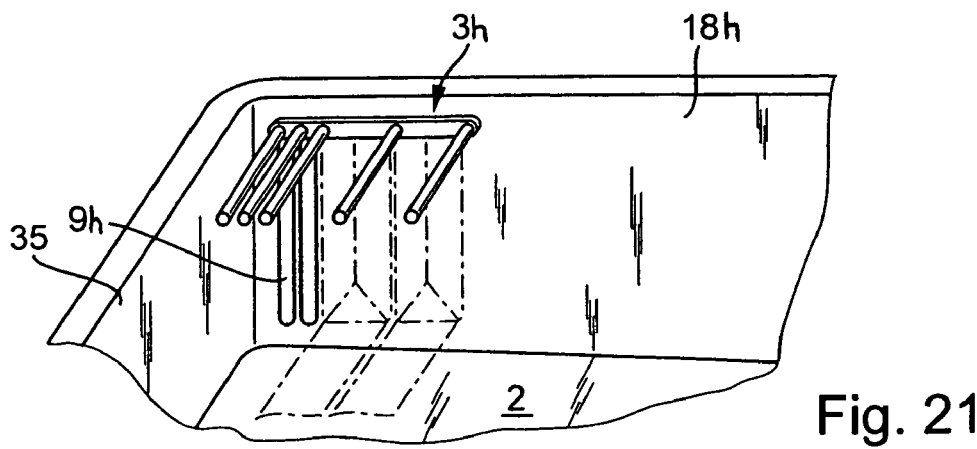
FIG. 21 depicts the embodiment depicted in FIG. 20, wherein the longitudinal guide is depicted in its inserted storage position.

In the embodiment depicted in FIGS. 20 and 21, the opposing mounting areas 3c in the area of the side walls 18g, 18h of the cargo space are provided with telescope-shaped extractable guide rails. Similar telescoping extractability is also provided in the mounting areas 3d depicted in FIG. 26. Each of the mounting areas 3c, 3h depicted in FIGS. 20 and 21 features a longitudinally displaceable guide rail 36, which is provided with receptacles for individual insertion of holding pins of storage bags 9g, 9h. In addition, a receptacle for insertion of a grouping unit 12a is provided, which combines several storage bags 9g, 9h and by means of which these storage bags 9g, 9h can be removed as a single unit. The upward removability of the grouping unit 12a from the guide rail 36 is indicated by arrows in the figure. The cargo space of the vehicle, as shown in FIGS. 20 and 21, features a downward folding rear part at its rear end, such as the type of part used, in particular, on open cargo surfaces of commercial vehicles and trucks. The mounting areas 3c, 3h are arranged in such a way that the longitudinally displaceable guide rails 36 can be pulled out toward the back over the lowered rear part. This facilitates the loading and unloading of storage bags 9g, 9h. The closed position of the rear part 35 and the inserted position of the mounting area 3h are depicted in FIG. 21.

Figure 26:
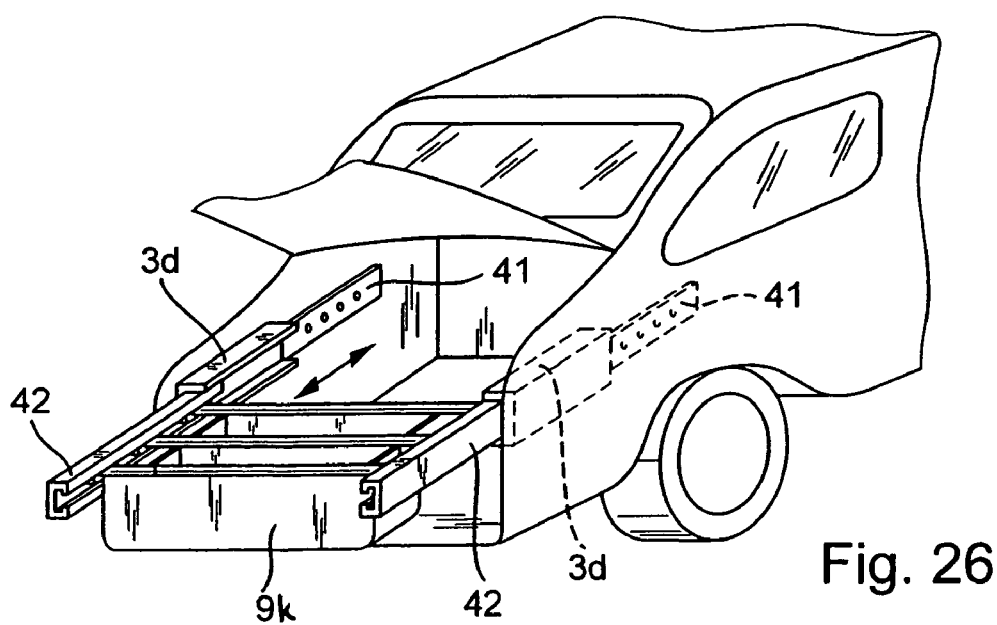
FIG. 26 depicts another embodiment of a storage bag, as described by the invention, with telescope-shaped extractable longitudinal guides for at least one storage bag in the lateral mounting areas.

In the embodiment depicted in FIG. 26, the longitudinally displaceable mounting areas 3d are provided in a cargo space of a notchback sedan. In this case, the mounting areas 3d feature guide rails 41 secured in the cargo space, on which hollow profile rails 3d run on movable bearings. Telescope rails 42 are longitudinally displaceable on bearings in these hollow profile rails, so that when they are pulled out—as depicted—the storage bags 9k can be substantially displaced toward the back or the front along the double arrow.

Figure 24:
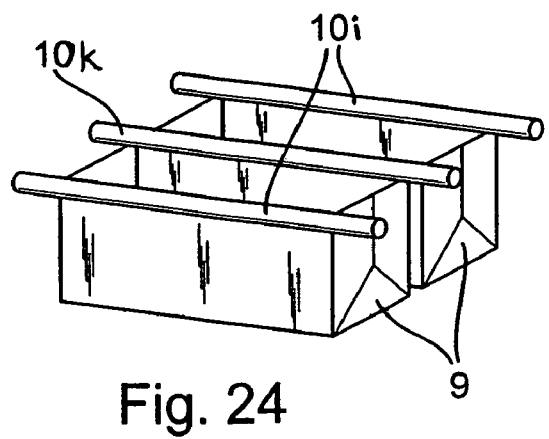
FIG. 24 depicts a pair of storage bags with a central, joint supporting section.
Figure 25:
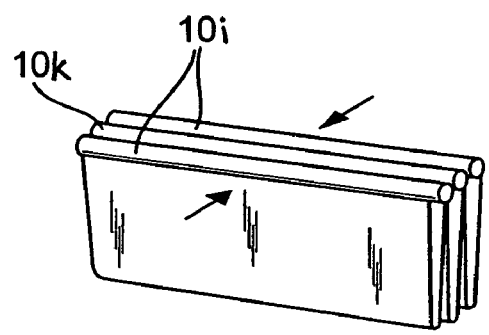
FIG. 25 depicts another embodiment of a pair of storage bags, wherein the folds are open at the side.

In the embodiment of a pair of storage bags depicted in FIGS. 24 and 25, each of the storage bags 9i features a separate outer supporting profile 10i, as well as sharing a joint inner supporting profile 10k, so that the two storage bags 9 are automatically and firmly connected to one another in the area of the shared supporting section 10a.

The variant of the folding structure with lateral folding segments arranged at the front is depicted in FIG. 24. FIG. 25 depicts the variant with track-shaped folding structures, in which the storage bags are open toward the front.

Figure 22:
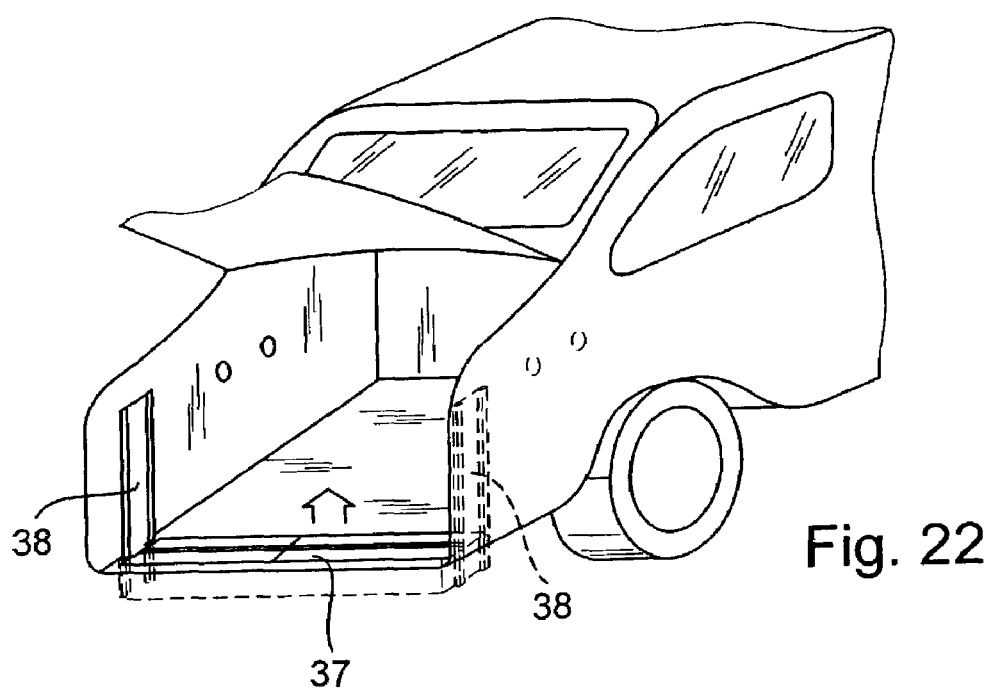
FIG. 22 schematically depicts another embodiment of a storage bag, as described by the invention, in a trunk of an automobile.
Figure 23:
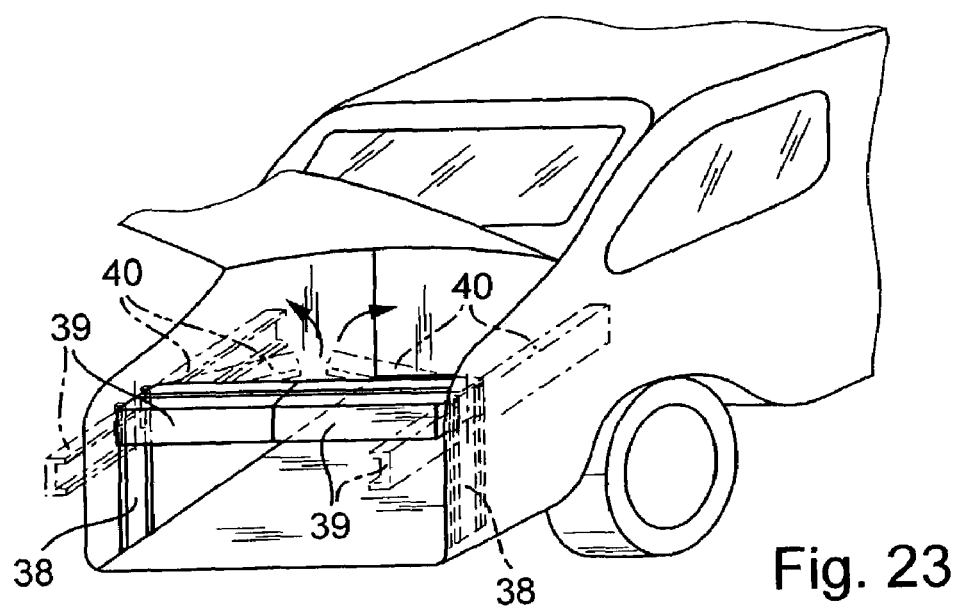
FIG. 23 depicts the storage bag depicted in FIG. 22 in its operating position.

In the embodiment depicted in FIGS. 22 and 23, the mounting device 37 is arranged in a sunken position in a recess in the cargo space floor to accept and secure corresponding storage bags. The mounting device 37 extends along the entire width of the cargo space floor. The mounting device 37 is designed as a cartridge-like housing, and features guides along each of its opposing front sides, by means of which the mounting device 37 is guided and can be height-adjusted in guide rails 38 that progress vertically upward. To bring the mounting device 37 into the operating position, the mounting device 37 is moved upward along the guide rails 38. This can be done manually or by means of a propulsion mechanism, which is not depicted in the figure. The mounting device is locked in the upper operating position. Then mounting areas 39, 40 tilt forward or backward by 90°, resulting in two parallel opposing guide rails both in front of and behind the mounting device. These guide rails 39, 40 are also locked in their parallel operating position, which is oriented in the longitudinal direction of the vehicle. At this point, storage bags can be inserted into the guide rails by means of their corresponding holding pins or adapters. To reestablish the inactive position, the mounting areas are simply tilted inward again, so that the mounting device 37 again forms a compact cartridge-shaped housing and can then be returned to its sunken inactive position.

Figure 27:
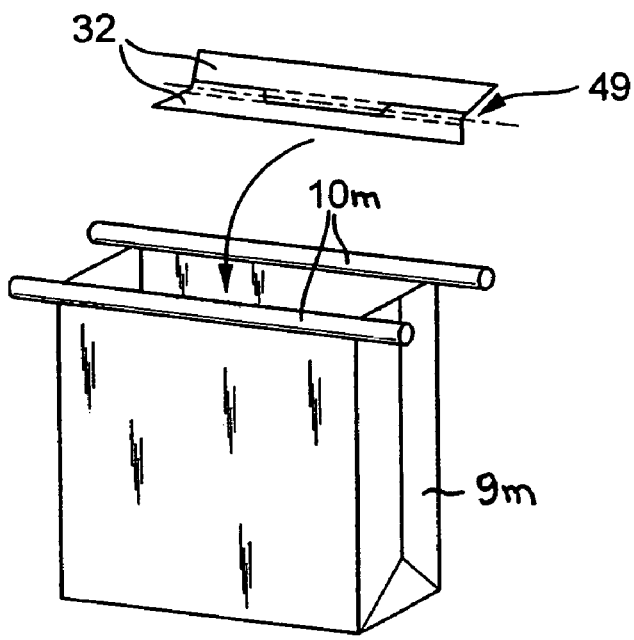
FIG. 27 schematically depicts an exploded view of an embodiment of a storage bag with a rigid insert floor.
Figure 28:
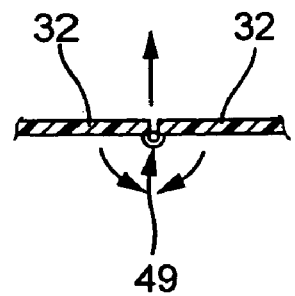
FIG. 28 depicts an enlarged, schematic view of a section of the insert floor depicted in FIG. 27.
Figure 29:
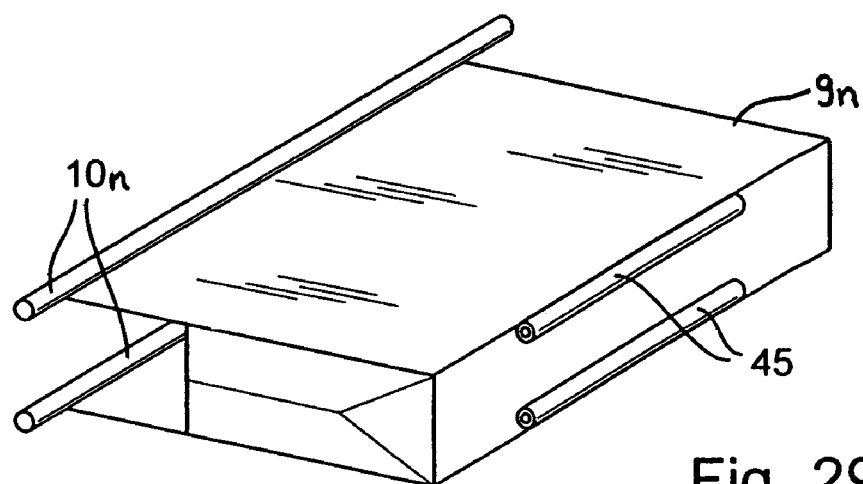
FIG. 29 depicts another embodiment of a folding bag with hollow profiles arranged in the floor section.

A storage bag 9m having supporting profiles 10m, such as that depicted in FIGS. 27 and 28, features a divided insert floor 32, where the two floor sections are linked together by means of a hinge arrangement 49. As is evident in FIG. 28, the hinge arrangement is designed in such a way that it is provided with stable support in the horizontal, flat operating position, in that the adjacent edges of the two floor segments 32 abut one another. As soon as compression or thrusting motion is applied to the hinge arrangement 49 from outside the floor area of the storage bag, the two floor sections 32 automatically fold together in the direction of the arrow by assuming vertical positions. It is also possible to attach, in a detachable manner, the floor segments 32 of the insert floor to various points of the floor area of the folding structure of the storage bag, so that an active connection is established between the insert floor 32 and the folding structure. This facilitates the folding and unfolding of the storage bag.

In the embodiments depicted in FIGS. 29 to 32, means are provided to automatically collapse the storage bag 9n from its opened operating position. To this end, two dimensionally stable hollow profiles 45 are attached to the exterior of the storage bag, which, in the example depicted in the figures, run in parallel to the supporting profiles 10n but only continue along a portion of the length of the two-dimensional structure.

Figure 30:
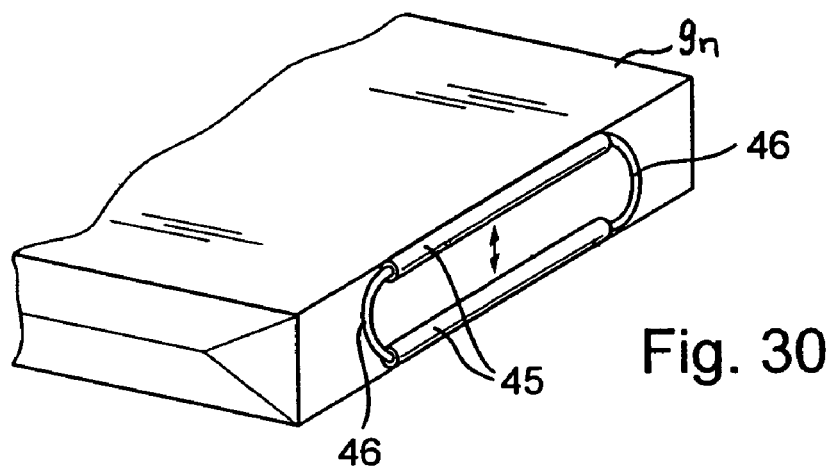
FIG. 30 depicts a section of the folding bag depicted in FIG. 29, wherein elastic tension elements are inserted into the hollow profiles.
Figure 31:
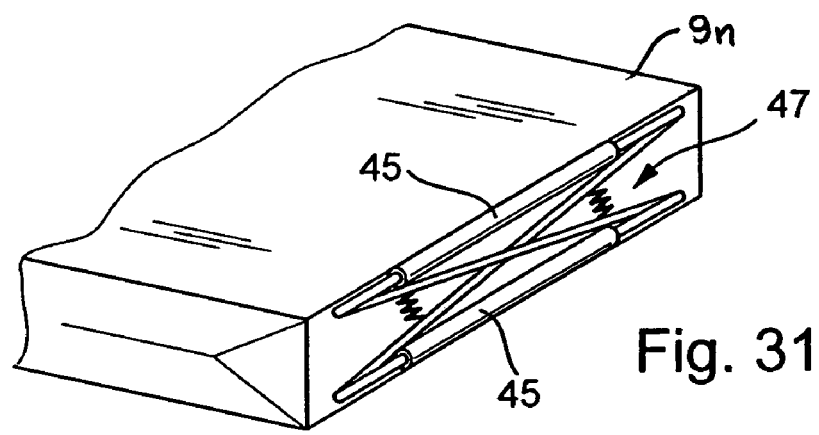
FIG. 31 depicts another embodiment of a folding bag similar to that depicted in FIGS. 29 and 30, wherein scissor-like tension elements are provided for folding together the storage bag.
Figure 32:
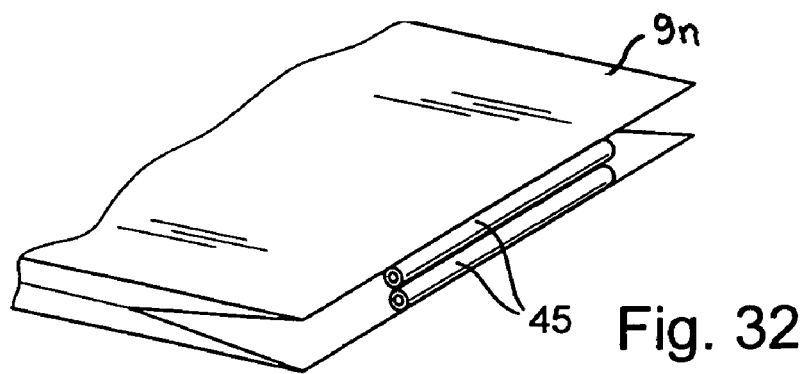
FIG. 32 depicts the folding bag of FIG. 31 in a collapsed position.

In the embodiment depicted in FIG. 30, elastic straps 46 are partially integrated in the hollow profiles 45, which are brought into their tensed state when the storage bag is in its open operating position. Because of the resulting tensile force, these straps support the collapsing motion of the storage bag. In embodiment depicted in FIGS. 31 and 32, scissor-shaped elastic tension elements 47 are provided which automatically bring the storage bag from the operating position depicted in FIG. 31 to the collapsed inactive position depicted in FIG. 32.

Figure 33:
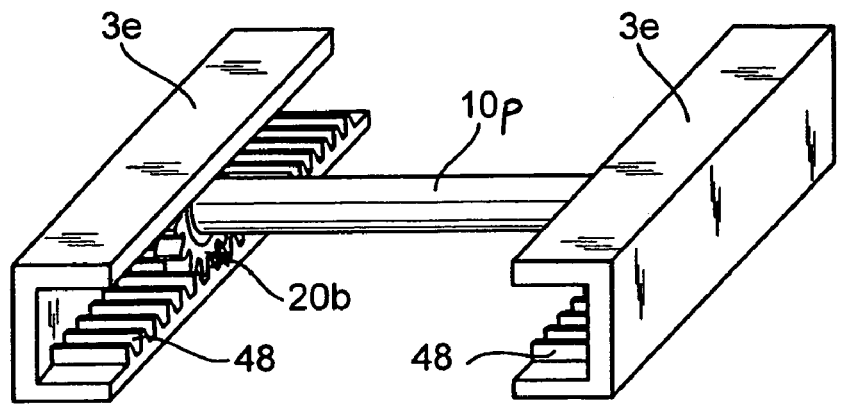
FIG. 33 schematically depicts a view of a mounting device for a longitudinally movable supporting profile consisting of two mounting areas formed as guide rails.
Figure 34:
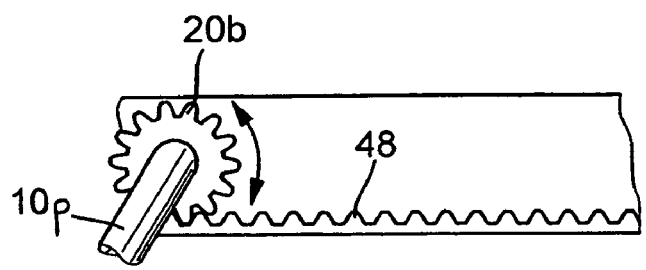
FIG. 34 schematically depicts a side view of the embodiment depicted in FIG. 33.

The embodiment depicted in FIGS. 33 and 34 discloses, in schematic form, synchronization mechanisms 20b, 48, which are used to displace, in parallel, opposing holding pins or grouping units relative to a transverse axis progressing at a right angle between the opposing mounting areas 3e. To this end, the supporting profiles 10p bearing the folding structures are formed as hollow profiles bisected by a shaft. The shaft protrudes from the opposing front ends of each supporting profile 10p. Adapters in the form of grooves 20b are arranged in these terminal areas, each of which comb against a toothed rack profile 48 in each mounting area 3e. The opposing toothed rack profiles 48 for each of the two mounting areas 3e, which are formed as guide rails, are identical to one another, so that when the supporting profiles 10p are displaced the opposing grooves 20b guarantee the same movement forward, due to the identical distribution of teeth on both front sides. As a result, while they are being displaced the supporting profiles 10p always remain parallel to a transverse axis progressing between the opposing mounting areas 3d, thereby remaining consistently at right angles to the longitudinal axes of the mounting areas 3e.

Figure 35:
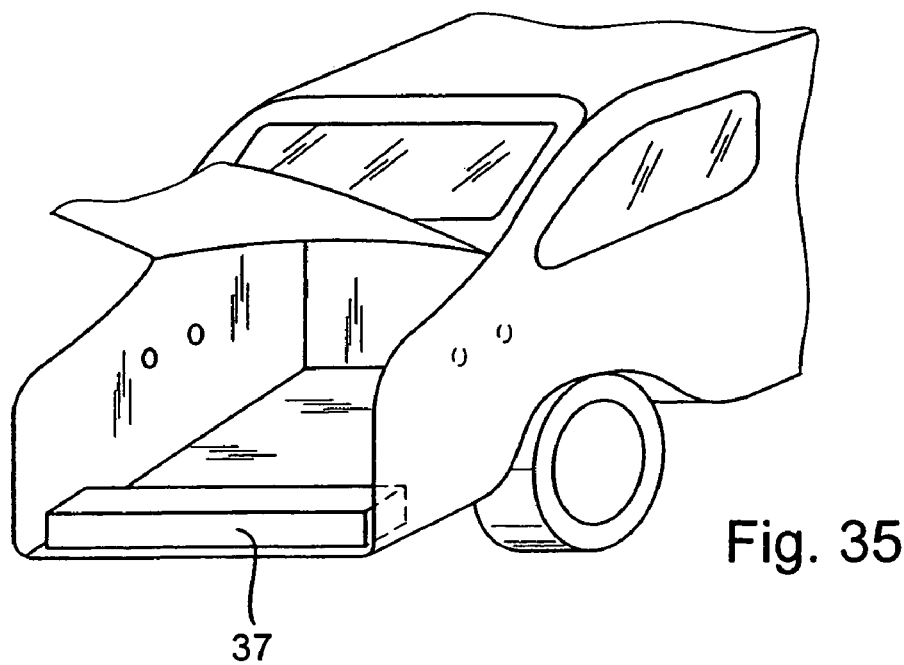
FIG. 35 schematically depicts an embodiment of a storage bag similar to that depicted in FIG. 22.

The embodiment depicted in FIG. 35 corresponds essentially to the embodiment depicted in FIG. 22. The significant different between the two embodiments is that in this case the cartridge-shaped mounting device 37 is not recessed into the cargo space floor, but is instead arranged on the cargo space floor. In this case, it is possible to adjust the height of the mounting device 37 with the aid of telescoping rods or otherwise designed height adjustment tools.

Figure 36:
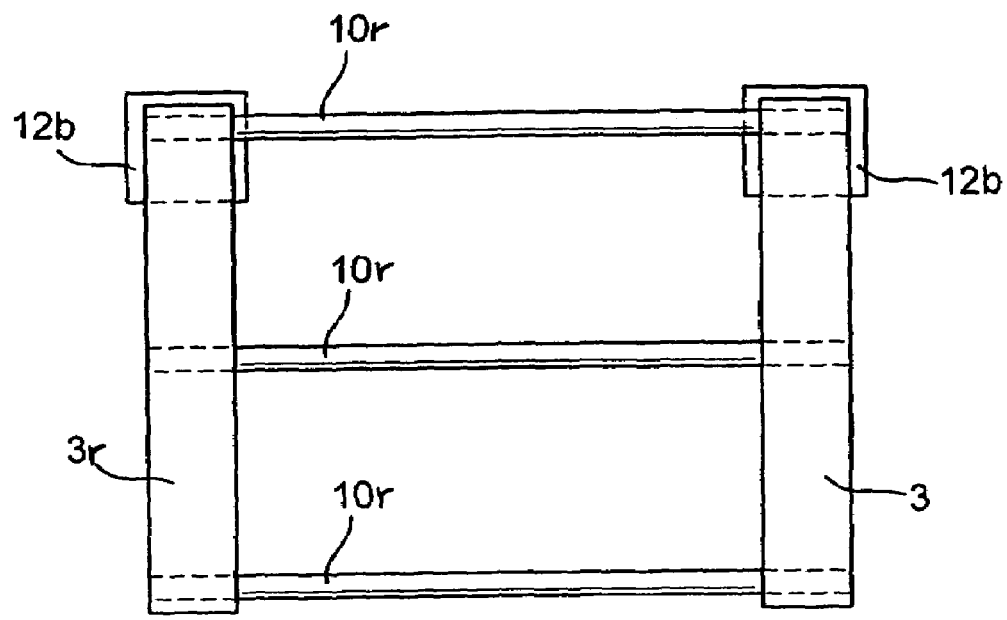
FIG. 36 schematically depicts an aerial view of an embodiment of a storage bag with multiple locking positions for the supporting profiles.
Figure 37:
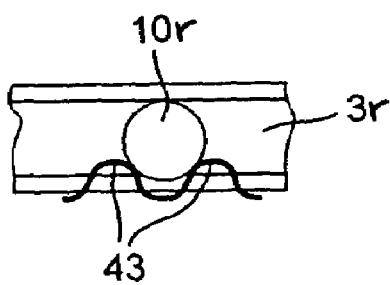
FIG. 37 depicts an enlarged sectional view of a supporting profile in the area of the locking mechanisms for the mounting device.
Figure 38:
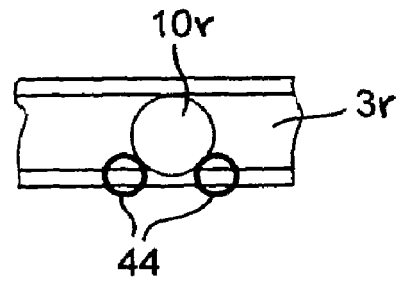
FIG. 38 depicts a view similar to that depicted in FIG. 37, but with modified locking mechanisms.

FIG. 36 depicts a schematic aerial view of a mounting device provided with two parallel mounting areas 3r. For reasons of simplification, only one supporting profile 10r is provided between two grouping units 12b, which are longitudinally displaceable along corresponding guide rails in the mounting areas 3r. Alternatively, it is also possible to displace the supporting profiles 10r and their holding pins directly, i.e., without combining them into a grouping unit, along the guide rails. To allow for locking or fastening of the supporting profiles 10r or the grouping units 12b into various positions along the length of the mounting areas 3, locking mechanisms 43, 44 are installed in the guide rails at those points at which the supporting profiles 10r or the grouping units 12b are to be locked. These locking mechanisms 43, 44 can be limbs, springs, or catch points 44 provided with ball bearings, as schematically depicted in FIGS. 37 and 38.

Figure 39:
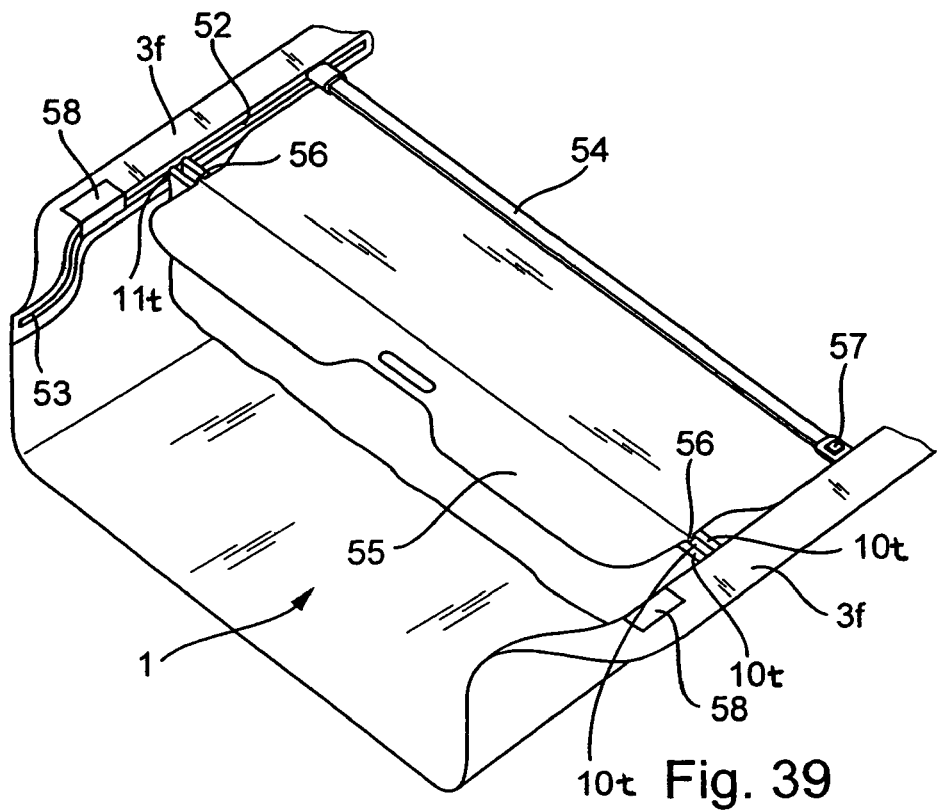
FIG. 39 depicts, in an exploded view, a further embodiment of a storage bag with a displaceable cassette housing.
Figure 40:
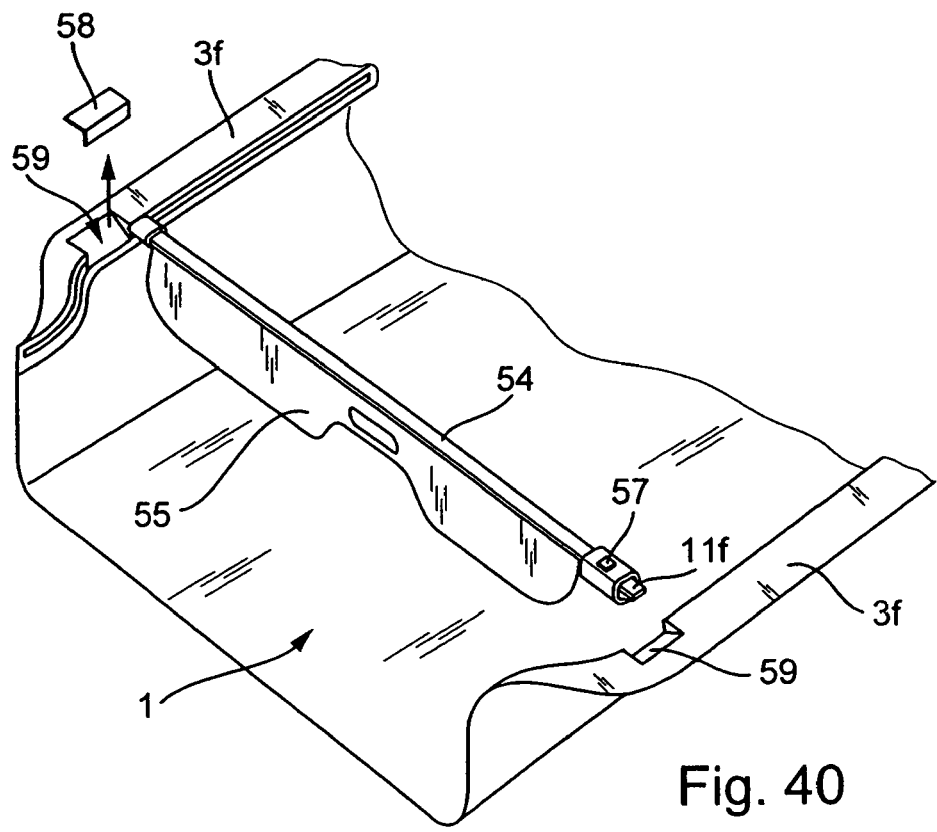
FIG. 40 depicts the storage bag depicted in FIG. 39, in a removal position of the cassette housing.

In a storage device according to FIGS. 39 and 40, longitudinal guides 3f are provided in the area of the opposing lateral walls of the cargo space 1, each of which is provided with a guide slit 52 which is open to the center of the cargo space. On the one hand, holding pins 1t of supporting sections 10t for storage bags, which are displaceably arranged in the longitudinal guides 3f, i.e., along the guide slit 52, are held in the guide slits 52. The holding and guiding of the holding pins 11t corresponds to the exemplary embodiments described above, thus precluding the need to discuss this issue in detail at this point. The longitudinal guides 3f are designed as track profiles, each of which is provided with an open section 59 at the same height. In the area of the open sections 59, the holding pins 11t, and therefore the supporting sections 10t as well as the storage bags, are removable from above or can be inserted from above into the longitudinal guides 3f. For closing the open sections, cover elements 58 are provided which can be removed or inserted manually. The cover elements 58 are provided with corresponding locking or guide edges which can be fit into corresponding locking or guide grooves in the open sections 59, thus allowing for secure positioning of the cover elements 58 in the longitudinal guides 3f.

In addition to the storage bags, a cassette housing 54 is held in the longitudinal guides 3f which is provided with a holding pin 11f on each of the opposing faces. The holding pin 11f on each face of the cassette housing 54 is designed in such a way that it permits, on the one hand, mounting of the cassette housing 54 in the longitudinal guides 3f. On the other hand, the holding pins 11f guarantee displaceability of the cassette housing 54 within the guide slits 52 of the longitudinal guides 3f. In addition, a blocking mechanism 57 is assigned to the cassette housing which is designed to be opened manually and guarantees blocking of the longitudinal displaceability of the cassette housing 54 in the guide slits 52. The locking mechanism 57 features, in a non-detectable manner, a braking element in the area of at least one holding pin 11f, which accomplishes a positive or non-positive fixing of the holding pin 11f in the respective guide slit 52. By pressing an operating key for the locking mechanism 57, the braking or blocking effect of the braking element is cancelled, which renders the cassette housing 54 displaceable. The cassette housing 54 can—as is recognizable in FIG. 40—be displaced up to the open sections 59 and then removed from above at this point. In the same manner, the cassette housing 54 can also be reinserted from above into the guide slits 52 in the area of the open sections 59.

The longitudinal guides 3f taper toward a rear section of the cargo space 1, which is not depicted in detail, where they form slit guides 53. Said slit guides are provided to accept lateral guide elements 56 of a contour section of a cargo space cover 55 which constitutes a flexible two-dimensional structure. The flexible two-dimensional structure is held on a coiling shaft within the cassette housing, which is not depicted in detail, and is arranged to be capable of being rolled and unrolled relative to said coiling shaft. The cargo space cover 55 itself can also be provided with support rods disposed at a diagonal to the pull-out direction and uniformly spaced along the length of the two-dimensional structure, which support rods can be held in the guide slits 52 of the longitudinal guides 3f. The height of the longitudinal guides 52 can preferably be dimensioned in such a way that the front ends of the support rods can be passed through the guide slits 52 above the holding pins 11t of the storage bags. It is also possible to provide the cargo space cover with stabilizing support rods which, however, are not fed through the lateral guide slits 52. A horizontal spanning, for example, of the flexible two-dimensional structure, i.e., the cargo space cover 55, is then preferably accomplished by the recuperating force of a recuperating spring acting on the coiling shaft.

The purpose of the slit guides 53 is to fix the contour section of the cargo space cover 55 by means of the guide elements 56 in the spanned covering position in the rear section of the cargo space 1. To secure the contour section and the guide elements 56 in the slit guides 53, locking elements, which are not depicted in detail, are provided in both slit guides 53, which permit securing of the cargo space cover 55 in its spanned condition as well as release for returning it to the resting position. As is evident in FIG. 39, the slit guides 53 are offset farther toward the center of the cargo space relative to the guide slits 52. Corresponding to this arrangement, the guide elements 56 are also offset toward the center of the cargo space relative to the holding pins 11t or 11f. Corresponding to this arrangement, the guide elements 56 are also positioned to be offset toward the center of the cargo space relative to the holding pins 11t or 11f.

Figure 41:
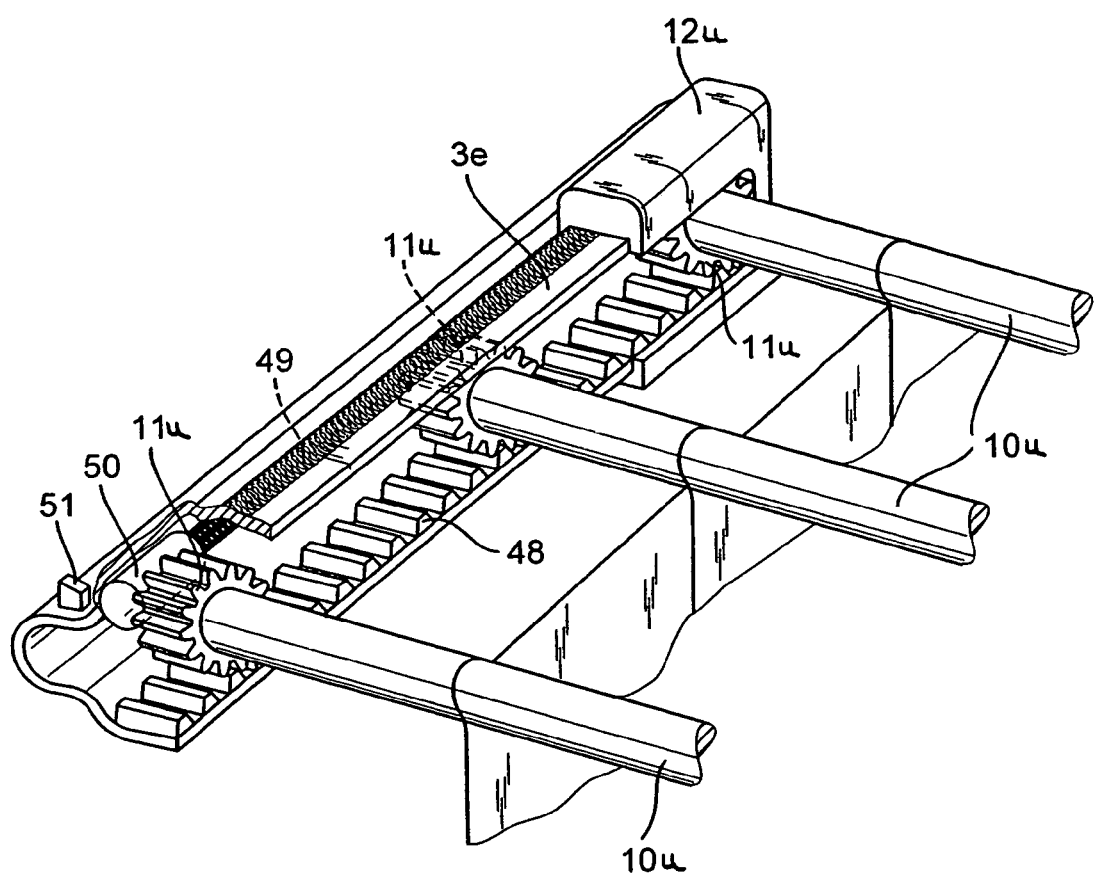
FIG. 41 depicts, in an enlarged, schematic view, an embodiment similar to that depicted in FIG. 33 or 36, in which a propulsion device in the form of a recuperating spring is allocated to the holding pins.

In the embodiment depicted in FIG. 41, a grouping unit 12u is provided in the area of the longitudinal guide 3e, wherein each grouping unit 12u features guide segments which are aligned with a guide slit of the longitudinal guide 3e when the grouping unit 12u is in its installed condition. In addition, a delimination of the guide segment on the floor side is provided in the form of a toothed structure, which represents a continuation of a toothed structure of the guide slit of the longitudinal guide 3e. The toothed structure serves as a means of synchronization 48 for parallel alignment of the support rods 10u for the storage bag. In FIG. 41, the grouping unit 12 is positioned, to be secure in the cargo space, in an extension of the longitudinal guide 3e or in a corresponding open section of the longitudinal guide 3e or a corresponding recess. The grouping unit 12u can be unlocked from this position and removed. At the same time, it can accept all support rods 10u of the storage bags, so that the grouping unit 12u can be removed, together with the storage bags, on each side of the storage bags.

To achieve automatic recuperation of the holding pins 11u and the support rods 10u in the area of the grouping unit 12u, a recuperation device 49 to 51 is provided. The recuperation device features a recuperating spring 49, which is secured to an adapter piece 50 engaging the frontmost support rod 10u of the pair of storage bags. The recuperating spring 49 is held on the grouping unit 12u at its opposing face. The adapter piece 50 is displaceably disposed in parallel to the guide slit in a longitudinal groove segment of the longitudinal guide 3e. A manually controllable locking mechanism 51 which either locks the adapter piece 50 or releases it for a recuperating motion caused by the recuperating spring 49 is assigned to the adapter piece 50. The locking mechanism 51 features a manually controllable operating key whose movement controls the blocking or release of the adapter piece 50. The adapter piece 50 is preferably formed as a damper, so as to brake or cushion the recuperating motion initiated by the recuperating spring 49. The adapter piece 50 is preferably designed in such a way that it provides a certain amount of non-positive resistance to a recuperating motion in the longitudinal groove segment, whereby the cushioning effect is accomplished.

What is claimed is:

1. A storage device for a cargo space of a motor vehicle, comprising at least one partially flexible storage bag configured to be firmly secured in the cargo space, the storage bag comprising two opposing sides featuring a dimensionally stable supporting section extending along at least a length of the corresponding side, wherein opposing front areas of the supporting sections can be selectively attached to a mounting device in the cargo space, and the dimensionally stable supporting sections are connected to one another by a flexible folding structure extending into at least one floor area of the storage bag, wherein opposing front areas of the supporting sections are configured as holding pins protruding laterally outward and can be selectively attached to a mounting device in the cargo space, the mounting device further comprising two mounting areas which flank the storage bag on opposing sides, wherein each mounting area is provided with a longitudinal guide in the cargo space which is at least partly arranged in parallel to a cargo space floor for allowing the holding pins to be shifted, wherein the supporting sections and the folding structure are arranged in operating positions in such a way that the storage bag can be folded open or shut symmetrically to its central longitudinal axis, and further comprising means for automatically folding the storage bag.

2. The storage device according to claim 1, wherein at least two storage bags arranged in parallel to one another are provided.

3. The storage device according to claim 2, wherein the two storage bags are connected to one another by means a joint supporting section.

4. The storage device according to claim 1, wherein the means for automatically folding the storage bag comprises elastic tension or pressure elements engaging in the area of the supporting sections.

5. The storage device according to claim 4, wherein the elastic tension or pressure elements are at least partially integrated into hollow profiles, especially in the area of the supporting sections.

6. The storage device according to claim 1, wherein fasteners are provided to secure the storage bag in a compact inactive state.

7. The storage device according to claim 1, wherein the folding structure progresses as a track-shaped fold between two supporting profiles.

8. The storage device according to claim 1, the folding structure comprising lateral folding segments in opposing front edge areas, with the folding segments acting as front side walls for the storage bag.

9. The storage device according to claim 8, wherein at least one essentially dimensionally stable and, in particular, split insert floor is provided for a floor section of the folding structure.

10. The storage device according to claim 1, wherein the mounting device for securing the holding pins features corresponding receptacles.

11. The storage device according to claim 1, wherein the longitudinal guides of each mounting area feature corresponding open sections which are dimensioned in such a way that a corresponding holding pin or a grouping unit can be removed or inserted at the level of the respective section.

12. The storage device according to claim 11, wherein each grouping unit is provided with a guide segment which is aligned with the corresponding longitudinal guide when the grouping unit is in its inserted condition.

13. The storage device according to claim 11, wherein a housing is provided for acceptance of at least one flexible two-dimensional structure which progresses at a diagonal between the longitudinal guides and is provided with holding pins in the area of opposing faces which are displaceably disposed in the longitudinal guides.

14. The storage device according to claim 13, wherein the housing features a locking mechanism which detachably blocks the housing in the longitudinal guides.

15. The storage device according to claim 11, wherein a propulsion mechanisms are provided to displace the holding pins or the grouping units within the longitudinal guides.

16. The storage device according to claim 1, wherein the longitudinal guide is designed to be pulled out in an extension of the mounting area.

17. The storage device according to claim 16, wherein blocking mechanisms are provided to lock the longitudinal guide or the grouping unit.

18. The storage device according to claim 1, wherein the longitudinal guides progress downward relative to the cargo space floor in a front or rear terminal section.

19. The storage device according to claim 1, wherein adapters are provided so that the holding pins can be connected, in a detachable manner, to the mounting areas, the longitudinal guides, or the grouping units.

20. The storage device according to claim 19, wherein adjacent adapters can be joined together, in a detachable manner, by means of snap-in locking mechanisms.

21. The storage device according to claim 20, wherein the snap-in locking mechanisms are molded to the adapters in one piece.

22. The storage device according to claim 1, wherein the mounting device inside the cargo space runs on movable bearings between a recessed inactive position, especially in the floor of the cargo space or in a divider, and an operating position.

23. The storage device according to claim 22, wherein the mounting device features at least two movable mounting areas, which can be moved from an inactive position collapsed in the mounting device to an operating position spaced at a distance from one another and accepting at least one storage bag between the mounting areas.

24. The storage device according to claim 23, wherein the mounting areas are arranged to pivot horizontally on the mounting device.

25. The storage device according to claim 1, wherein a covering structure that can be pulled out horizontally and that covers at least one storage bag in a pulled-out position is assigned to the storage device.

26. The storage device according to claim 1, wherein synchronization mechanisms are provided which are used to displace, in parallel, opposing holding pins or grouping units of at least one storage bag relative to a transverse axis progressing at a right angle between the opposing mounting areas.

* * * * *